US010061289B2

(12) United States Patent
Haghighat-Kashani et al.

(10) Patent No.: US 10,061,289 B2
(45) Date of Patent: Aug. 28, 2018

(54) SYSTEM AND METHOD OF COMPILING AND ORGANIZING POWER CONSUMPTION DATA AND CONVERTING SUCH DATA INTO ONE OR MORE USER ACTIONABLE FORMATS

(71) Applicant: c/o Neurio Technology Inc., Vancouver (CA)

(72) Inventors: Ali Haghighat-Kashani, Vancouver (CA); Janice Tze-Nee Cheam, Vancouver (CA); Jonathan Mark Hallam, Vancouver (CA)

(*) Notice: Subject to any disclaimer, the term of this patent is extended or adjusted under 35 U.S.C. 154(b) by 162 days.

(21) Appl. No.: 15/348,927

(22) Filed: Nov. 10, 2016

(65) Prior Publication Data

US 2017/0082995 A1 Mar. 23, 2017

Related U.S. Application Data

(63) Continuation of application No. 14/372,056, filed as application No. PCT/CA2013/000062 on Jan. 21, 2013, now abandoned.
(Continued)

(51) Int. Cl.
*G05D 3/12* (2006.01)
*G05B 19/048* (2006.01)
(Continued)

(52) U.S. Cl.
CPC .......... *G05B 19/048* (2013.01); *G06Q 30/02* (2013.01); *G06Q 50/06* (2013.01); *H04L 67/30* (2013.01); *G05B 2219/2639* (2013.01)

(58) Field of Classification Search
None
See application file for complete search history.

(56) References Cited

U.S. PATENT DOCUMENTS 8,170,722 B1 * 5/2012 Elberbaum ........... H04L 12/281
455/151.1
8,350,697 B2 * 1/2013 Trundle ................. G08C 19/16
340/539.3
(Continued)

FOREIGN PATENT DOCUMENTS

EP 2400440 12/2011
EP 2402771 1/2012
(Continued)

OTHER PUBLICATIONS

International Search Report issued for Patent Cooperation Treaty application No. PCT/CA2013/000062, dated Jun. 12, 2013.
(Continued)

*Primary Examiner* — Adam Lee

(57) ABSTRACT

A method and system for use in creating a profile of, managing and understanding power consumption in a premise of a user, wherein said premise comprises two or more power consuming devices comprises measuring, via at least one sensor, aggregate energy consumption at the premise, receiving at a mobile computing device comprising a data processor, said aggregated signal from the sensor, collecting and recording the aggregate signal over a plurality of time resolutions and frequencies, therein to create a predicted aggregate signal for each time x and frequency y, detecting changes in the predicted aggregate signal at time x an frequency y (detected consumption pattern changes) and conveying to at least one of the user, a utility company, and other third party a notification of detected consumption pattern changes.

20 Claims, 23 Drawing Sheets

Related U.S. Application Data

(60) Provisional application No. 61/589,203, filed on Jan. 20, 2012.

(51) Int. Cl.
  *G06Q 30/02* (2012.01)
  *G06Q 50/06* (2012.01)
  *H04L 29/08* (2006.01)

(56) References Cited

U.S. PATENT DOCUMENTS

| | | | | |
|---|---|---|---|---|
| 8,527,105 | B1* | 9/2013 | Choong | G01D 4/004 315/294 |
| 8,744,640 | B2* | 6/2014 | Yonezawa | G01D 4/00 700/295 |
| 8,843,242 | B2* | 9/2014 | Burt | F24C 7/087 307/38 |
| 2001/0025209 | A1* | 9/2001 | Fukui | G06Q 50/06 700/291 |
| 2005/0049758 | A1* | 3/2005 | Lehr | G05F 1/66 700/291 |
| 2007/0203860 | A1 | 8/2007 | Golden et al. | |
| 2008/0106425 | A1* | 5/2008 | Deaver | G01R 19/16547 340/646 |
| 2008/0252141 | A1* | 10/2008 | Horst | H02J 3/14 307/35 |
| 2010/0318235 | A1* | 12/2010 | Moss | H04L 67/12 700/295 |
| 2011/0144819 | A1 | 6/2011 | Andrews et al. | |
| 2011/0172792 | A1* | 7/2011 | Shinohara | G06Q 50/06 700/90 |
| 2011/0178610 | A1* | 7/2011 | O'Connor | G06Q 10/06 700/30 |
| 2011/0184575 | A1* | 7/2011 | Kawamoto | G06Q 50/06 700/292 |
| 2011/0184580 | A1* | 7/2011 | Kawamoto | H02J 3/14 700/295 |
| 2011/0202293 | A1* | 8/2011 | Kobraei | G06Q 10/06 702/62 |
| 2011/0213739 | A1 | 9/2011 | Benitez et al. | |
| 2011/0238235 | A1* | 9/2011 | Xia | H02J 13/0024 700/297 |
| 2011/0251807 | A1 | 10/2011 | Rada et al. | |
| 2011/0302125 | A1 | 12/2011 | Shetty et al. | |
| 2011/0320013 | A1* | 12/2011 | Chen | G05B 15/02 700/12 |
| 2012/0004785 | A1* | 1/2012 | Son | G01D 4/00 700/295 |
| 2012/0004871 | A1* | 1/2012 | Tsao | G01R 19/2513 702/61 |
| 2012/0065799 | A1* | 3/2012 | Xia | H04L 12/10 700/295 |
| 2012/0083934 | A1* | 4/2012 | Jesudason | G06F 1/3203 700/291 |
| 2012/0116544 | A1* | 5/2012 | Shrubsole | H05B 37/02 700/12 |
| 2012/0143387 | A1* | 6/2012 | Indovina | G01R 19/2513 700/297 |
| 2012/0166010 | A1* | 6/2012 | Chou | H04L 12/2818 700/296 |
| 2012/0166115 | A1* | 6/2012 | Apostolakis | G06Q 50/06 702/62 |
| 2012/0265586 | A1* | 10/2012 | Mammone | G06Q 30/02 705/14.1 |
| 2012/0310800 | A1* | 12/2012 | Xia | G06Q 30/04 705/34 |
| 2013/0046703 | A1* | 2/2013 | Ambati | G06Q 10/06 705/319 |
| 2013/0085921 | A1* | 4/2013 | Nguyen | G06Q 10/10 705/37 |
| 2013/0124000 | A1* | 5/2013 | Matsumoto | H02J 9/062 700/295 |
| 2013/0131883 | A1* | 5/2013 | Yamada | H02J 3/14 700/295 |
| 2013/0158684 | A1* | 6/2013 | Takehara | H05B 37/0227 700/83 |
| 2013/0173076 | A1* | 7/2013 | Pan | H02J 3/14 700/292 |
| 2013/0211557 | A1* | 8/2013 | O'Brien | G01D 4/004 700/73 |

FOREIGN PATENT DOCUMENTS

| | | |
|---|---|---|
| GB | 2471536 | 1/2011 |
| WO | 2009103998 | 8/2009 |
| WO | 2010007369 | 1/2010 |
| WO | 2011084390 | 7/2011 |
| WO | 20110128883 | 10/2011 |
| WO | 2011153401 | 12/2011 |
| WO | 2012038858 | 3/2012 |
| WO | 2012049601 | 4/2012 |
| WO | 2013001395 | 1/2013 |
| WO | 2013011425 | 1/2013 |

OTHER PUBLICATIONS

Written Opinion issued for Patent Cooperation Treaty application No. PCT/CA2013/000062, dated Jun. 12, 2013.
IP Australia Search Report dated Aug. 15, 2016 issued for the co-pending application assigned Patent Application No. 2013210745 and an Earliest Priority Date of Jan. 20, 2012.
European Patent Office Search Report dated Aug. 19, 2015 issued for the co-pending application assigned Patent Application No. 13738334.5 and an Earliest Priority Date of Jan. 20, 2012.
Bijker, A. et al. "Active power residential non-intrusive appliance load monitoring system." In: AFRICON 2009, pp. 1-6 (2009).
Froehlich, J. et al. "Disaggregated End-Use Energy Sensing for the Smart Grid." IEEE Pervasive Computing table of contents archive, vol. 10 Issue 1, Jan. 2011, pp. 28-39.
Zeifman, M. et al. "Nonintrusive appliance load monitoring: Review and outlook." IEEE Transactions on Consumer Electronics, 57(1): 76-84. 2011.

* cited by examiner

SYSTEM AND METHOD OF COMPILING AND ORGANIZING POWER CONSUMPTION DATA AND CONVERTING SUCH DATA INTO ONE OR MORE USER ACTIONABLE FORMATS

CROSS-REFERENCE TO RELATED APPLICATIONS

This application is a continuation of U.S. application Ser. No. 14/372,056, filed Jul. 14, 2014, which is the National Stage of International Application No. PCT/CA2013/000062, filed Jan. 21, 2013, which in turn claims the benefit of U.S. Provisional Application No. 61/589,203, filed on Jan. 20, 2012, all of which are herein incorporated by reference in their entirety.

FIELD OF THE INVENTION

The present invention relates to the field of granular power monitoring, data analytics and enhanced data use at both the consumer and industry levels.

BACKGROUND OF THE INVENTION

Energy management is a term that generally relates to or is implemented by systems, processes and devices in order to reduce energy consumption and understand energy consumption patterns. This can occur in private homes, in businesses, in factories/manufacturing facilities and in public-sector/government organizations, to name a few.

From the perspective of an energy consumer, the process of monitoring, controlling, and conserving energy in a building or organization typically involves the following steps, with noted challenges and limitations:

1. Metering (in some fashion) energy consumption and collecting the data.
2. Understanding the raw data and/or collecting data that is useful.
3. Finding opportunities to save energy, and estimating how much energy each opportunity could save. For example, an individual could analyze her meter data to find and quantify routine energy waste, and might also investigate the energy savings that could be made by replacing equipment (e.g. lighting) or by upgrading a building's insulation.
4. Taking action to target the opportunities to save energy (i.e. addressing the routine waste and replacing or upgrading inefficient equipment).
5. Tracking progress by analyzing meter data to see how well the energy-saving efforts have worked.

At a consumer level, as the cost of energy/electricity continues to increase, there is greater awareness of consumption issues and more thought put into sustainable energy planning. For example, people are buying more high fuel efficiency cars including both smaller and hybrid electric cars.

However, in order for people to use less energy/electricity in their homes and businesses, they need to have some means to assess energy usage and to make appropriate adaptations and decisions. One approach in energy-data collection is to manually read meters once a week or once a month. This is not only onerous but of very limited use in terms of data spread.

An alternative approach to energy-data collection is to install interval-metering systems that automatically measure and record energy consumption at short, regular intervals such as every hour, every 15-minutes, or even every few seconds when needed. This detailed interval energy consumption data makes it possible to see patterns of energy waste that it would be impossible to see otherwise: for example one can ascertain how much energy is being used at different times of the day or on different days of the week. Using the detailed interval data, it is possible to make broad brush estimates of how much energy is being wasted at different times. For example, if a person identifies that energy is being wasted by electronics left on over the weekends, one can:

a. Use interval data to calculate how much energy (in kWh) is being used each weekend.
 b. Estimate the proportion of that energy that is being wasted (by electronics that should be switched off).
 c. Using the figures from a and b, calculate an estimate of the total kWh that are wasted each weekend.
  i. This type of data and information is in bulk "aggregate" form and is not particular or granular.

Using power sensors on every device, it is possible to acquire an itemized bill that shows usage and energy cost for various appliances. With itemized data, consumers can take action to conserve, by either installing more energy efficient appliances (air conditioners, clothes washers/dryers, hot tubs, ovens, lighting, etc. . . . ), or changing their usage patterns in areas where pricing of energy/electricity varies by time of day, or simply turning loads off when not in use. The problem is that people do not want to incur the significant expense required to install power sensors on each of their appliances and electric loads. This underscores the significant problems:

a) while there is some value to the bulk aggregate data, it is not the definitive picture in energy management, in fact, it barely scratches the surface of what should be possible and available to power consumers; and b) load disaggregation or cataloguing power usage at a granular level is difficult to currently achieve. Even if power sensors are attached onto every single appliance in a home, there is still the issue of the value of the produced raw data without further enhancements and value added.

From the perspective of the consumer, as opposed to utility companies, there are some overlapping but also different concerns in regards to power usage. With the advent of "smart grid" technologies, also called "smart home", "smart meter", or "home area network" (HAN) technologies, optimized demand reductions became possible at the end use or appliance level. Some smart grid technologies provided the ability to capture real-time or near-real-time end-use data and enabled two-way communication. Smart grid technologies currently exist for at least some percentage of a utility's customer base and applications are growing throughout North America. From a consumer perspective, smart metering offers a number of potential benefits to householders. These include the provision of a tool to help consumers better manage their energy use. Smart meters with a display can provide up to date information on gas and electricity consumption in the currency of that country and in doing so help people to better manage their energy use and reduce their energy bills and carbon emissions.

Various "load disaggregation" (as defined below) algorithms have been suggested in the literature. One technique of decomposing the power signal measured at the incoming power meter into its constituent individual loads is known as Single Point End-use Energy Disaggregation (SPEED™), and is available from Enetics, Inc. of New York. The SPEED™ product includes logging premises load data and then transferring the data via telephone, walk-ups, or alternative communications to a Master Station that processes the recorder data into individual load interval data, acts as a server and database manager for pre and post processed energy consumption data, temperature data, queries from analysis stations, and queries from other information systems. This known technique runs on a Windows™ operating system.

While this improves the quality of decomposition techniques, there still exists the need, at the consumer level in particular, for a simple and inexpensive power consumption monitoring system that does not require a Master Station and/or additional people, resources to decompose an electric power meter signal to its constituent individual loads.

From the perspective of utility companies and energy traders, there is a need and demand to create demand projections and maintain a regulated reserve margin above (but not too far above) such demand. The capacity that is above or below that margin can be bought or sold in the energy markets.

Furthermore, there is a growing tendency towards unbundling the power system as different sectors of the industry (generation, transmission, and distribution) are faced with increasing demand on planning management and operations of the networks. The operation and planning of a power utility company requires an adequate model for power load forecasting. This load forecasting plays a key role in helping a utility to make important decisions on power, load switching, voltage control, network reconfiguration, and infrastructure development.

Data acquired from a plurality of households, businesses and other power consuming entities as to behaviors and power consumption, in a granular form would be highly desired.

It is an object of the present invention to obviate or mitigate the above disadvantages.

SUMMARY OF INVENTION

The present invention is directed generally to systems and methods for monitoring energy consumption and for related operations and, more specifically, for monitoring of energy consumption in premises with a view to providing consumption awareness to users and premise management systems. The present invention has wide reaching uses and applications and may be used, for example, for non-intrusive load monitoring, electricity monitoring, energy monitoring, in-house energy management, building automation, and for other applications. As a result, the present invention may be commercialized by utilities or third-parties as a product that enables consumers to better manage their electricity consumption. It can also be commercialized as a software solution for data aggregators like Google™ (for example, via Google PowerMeter™).

The present invention may be implemented as an aggregate measurement system that non-intrusively detects which power consuming devices are turned on and off in a building and reports usage information to either the user or to an automated energy management system or to a utility. The present invention may be implemented in many ways and may offer many benefits, some examples of which are identified below.

The present invention provides, in one aspect, a method for use in creating a profile of, managing and understanding power consumption in a home of a user, wherein said home comprises two or more power consuming devices which comprises:

a) measuring, via at least one sensor, aggregate energy consumption at the home;
b) receiving at a mobile computing device comprising a data processor, said aggregated signal from the sensor;
c) collecting and recording the aggregate signal over a plurality of time resolutions and frequencies, therein to create a predicted aggregate signal for each time x and frequency y;
d) detecting changes in the predicted aggregate signal at time x an frequency y (detected consumption pattern changes); and
e) conveying to at least one of the user, a utility company, and other third party a notification of detected consumption pattern changes.

The present invention provides, in another aspect, an unsupervised system for use in creating a profile of, managing and understanding power consumption in a home of a user, wherein said home comprises two or more power consuming devices which system comprises:

a) at least one sensor configured to measure aggregate energy consumption at the home;
b) a mobile computing device comprising a data processor;
c) computer readable memory including computer readable instructions which, when executed by the processor, cause the processor to perform the following steps: i) receive said aggregated signal from the sensor; ii) collect and record the aggregate signal over a plurality of time resolutions and frequencies, iii) create a predicted aggregate signal pattern for each time x and frequency y; vi) to detect changes in the predicted aggregate signal pattern at time x an frequency y (detected consumption pattern changes); and
d) a communication interface operably connected to the mobile computing device and configured for conveying to a user notification of detected consumption pattern changes.

The present invention provides, in another aspect, a system for use in creating a profile of, managing and understanding power consumption in a home, wherein said home comprises two or more power consuming devices which system comprises:

a) at least one sensor configured to measure at least one energy consumption variable associated with at least one energy consumption device within the home ("the selected device") and to generate at least one aggregated output signal therefrom;
b) a mobile computing device comprising a data processor;
c) computer readable memory comprising memory comprising a catalogue of a plurality of devices and one of a respective or estimated power draw of each such device, said memory including computer readable instructions which, when executed by the processor, cause the processor to perform the following steps: i) receive said aggregated signal from the sensor; ii) create and update a power profile for the selected device, iii) collect and analyze raw data in real time, iv) calculate a delta for each selected device (difference between an on state and an off state); v) calculate an estimated delta for the selected device, using ON-OFF-ON sequences (or OFF-ON-OFF) thereby acquiring a start value and end value, and vi) comparing the start value and end value to assess reliability of the estimated delta for the selected device; and
d) a communication interface operably connected to the mobile computing device and configured for receiving user commands and queries, for requesting user input in respect to said devices and for transmitting information relating to the devices to the user.

The present invention provides, in another aspect, a system for acquiring and storing disaggregated power consumption data in a premises which comprises:
a) at least one sensor configured to measure at least one desired energy consumption variable associated with a plurality of energy consumption devices within the premises and to generate at least one aggregated output signal therefrom;
b) a data processor configured to receive said aggregated signal from the sensor; said processor comprising a means to create and update a power profile for each individual device, said data processor comprising a memory which comprises a catalogue of each of said individual devices and a respective power draw of each device.

The present invention provides, in another aspect, a computer implemented method of acquiring, cataloguing and storing power consumption data in respect to a first energy consumption device (with an energy draw) within a premises comprising a plurality of energy consumption devices which comprises:
a) providing a sensor configured to measure at least one desired energy consumption variable associated with the plurality of energy consumption devices (including the first device) within the premises and to generate at least one aggregated output signal therefrom;
b) configuring a data processor to receive said aggregated signal from the sensor;
c) creating a power profile for the first device by instructing a user, via a user interface, to independently switch said device between on-off positions ("switching set up"), at least one time, to isolate a power draw for said device from the aggregated signal, wherein data processor recognizes that the first device was selected and isolates a differential in the aggregate signal based on differing switch positions during the switching set up, said differential being the energy draw of the first device; and
d) providing a memory which recallably stores the energy draw of the first device in a catalogue.

The present invention provides, in yet another aspect, a power consumption and notification system comprising:
a) at least one sensor configured to measure at least one desired energy consumption variable associated with at least one energy consumption device within a premises and to generate at least one aggregated output signal therefrom;
b) a data processor configured to receive said aggregated signal from the sensor; said processor comprising a means to create and update a power profile for each at least said one device, said data processor comprising a memory which comprises a catalogue of each of at least said one device and a respective power draw of each such device, said data processor including a means to collect and analyze raw data in real time, from at least one of following sources: smart grid networks; current sensors; user inputs relating to user-defined budgets; user inputs relating to his behaviors and schedules; user inputs relating to the function and activities of the devices; other user information available through a networked device such as contacts, demographics, etc; GPS and other location signals such as WiFi network IDs, names and signal strengths; macrogrid outputs from within a population in which user belongs; television and radio signals; memory based historical consumption data; said data processor including means to analyze, organize and reformat the raw data and to communicate to user based on information acquired from any of the sources; and
c) a user interface.

The present invention provides, in yet another aspect, a non-transitory processor readable medium storing code representing instructions to cause a processor to acquire, catalogue and store power consumption data in respect to a first energy consumption device (with an energy draw) within a premises comprising a plurality of energy consumption devices which comprises:
a) providing a sensor configured to measure at least one desired energy consumption variable associated with the plurality of energy consumption devices (including the first device) within the premises and to generate at least one aggregated output signal therefrom;
b) configuring a data processor to receive said aggregated signal from the sensor;
c) creating a power profile for the first device by instructing a user, via a user interface, to independently switch said device between on-off positions ("switching set up"), at least one time, to isolate a power draw for said device from the aggregated signal, wherein data processor recognizes that the first device was selected and isolates a differential in the aggregate signal based on differing switch positions during the switching set up, said differential being the energy draw of the first device; and
d) providing a memory which recallably stores the energy draw of the first device in a catalogue.

In one aspect, such a code comprises instructions to create a power profile for a second device by instructing a user, via a user interface, to independently switch said second device between on-off positions ("switching set up"), at least one time, to isolate a power draw for said second device from the aggregated signal, wherein data processor recognizes that the second device was selected and isolates a differential in the aggregate signal based on differing switch positions during the switching set up, said differential being the energy draw of the second device; and to provide a memory which recallably stores the energy draw of the second device in a catalogue.

The method and system of the present invention affords many advantages over the systems previously known. The use and criticality of the present innovation cannot be under-estimated: in order for people to use less energy/electricity in their homes, they need to have some means to assess energy usage and to make real time adaptations in a simple, cost effective way. The present invention, exemplified within the systems and methods described and claimed herein, provides the solution.

From the perspective of mass data acquisition, at the granular level, utilities and power traders are demanding granular information in order to assess energy consumption and to assess the impacts of such consumption on the electricity grid in terms of protection, control, cost efficiency and power quality issues.

As such the data analytics in accordance with the present invention yield superior demand forecasts by "segmenting" user profiles and modeling their consumption behavior separately using increased input data granularity. With access to real time segmented data, accurate short term (and long term) demand projections are made more accurately which affords significant cost saving to a utility and ultimately to a consumer, whether that consumer be a family, a business or a manufacturing operation.

DESCRIPTION OF THE FIGURES

The following figures set forth embodiments in which like reference numerals denote like parts. Embodiments are illustrated by way of example and not by way of limitation in the accompanying figures.

FIG. 2A shows a prompt to turn a device switch for the first time. FIG. 2B shows a prompt to input device information. FIG. 2C shows a prompt to input device information. FIG. 2D shows a prompt to turn the device switch a second time. FIG. 2E shows a prompt to adjust device usage information. FIG. 2F shows a prompt to save the information.

FIG. 7A shows a list of all profiled devices. FIG. 7B shows social information about each device. FIG. 7C shows a graphical representation for the catalogued devices.

FIG. 15A shows a welcome screen; FIG. 15B shows current household consumption; FIG. 15C shows a list of major energy consumers; FIG. 15D shows bills; and FIG. 15E shows unusual energy consumption.

PREFERRED EMBODIMENTS OF THE INVENTION

Figure 1:
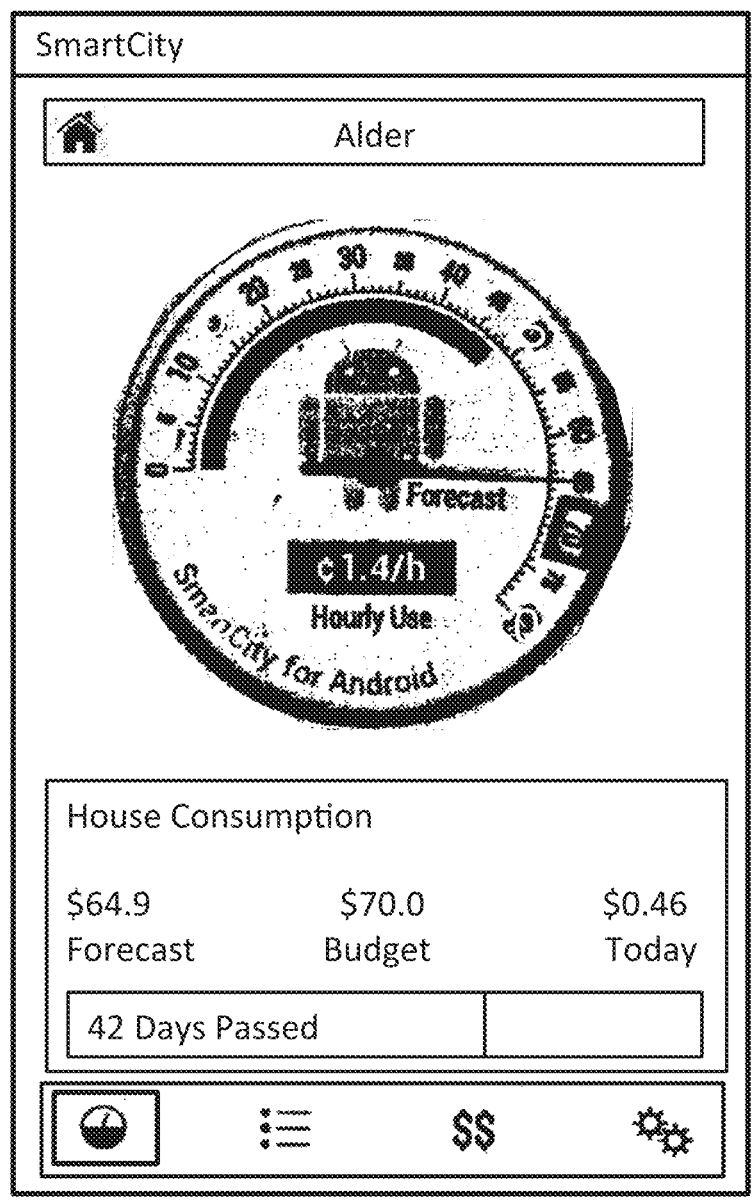
FIG. 1 is a schematic showing a smartphone dashboard (user interface) in accordance with the present invention.

A detailed description of one or more embodiments of the invention is provided below along with accompanying figures that illustrate the principles of the invention. As such this detailed description illustrates the invention by way of example and not by way of limitation. The description will clearly enable one skilled in the art to make and use the invention, and describes several embodiments, adaptations, variations and alternatives and uses of the invention, including what we presently believe is the best mode for carrying out the invention. It is to be clearly understood that routine variations and adaptations can be made to the invention as described, and such variations and adaptations squarely fall within the spirit and scope of the invention.

In other words, the invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Similar reference characters denote similar elements throughout various views depicted in the figures.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within a computer system's registers and memories into other data similarly represented as physical quantities within the computer system memories or registers or other such information storage, transmission or display devices.

The algorithms and displays with the applications described herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

The terms "mobile device" or "mobile processing device" both refer herein interchangeably to any computer (for example desk top or laptop computers), microprocessing device, personal digital assistant, SmartPhone other cell phone, tablets and the like. Preferably, devices comprise iPhones™, iPADS™, other devices operating via iOS™ or MAC OS™, or devices operating on Android™ OS.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "habit", as used herein refers to a recurrent, conscious or often unconscious pattern of behavior that is acquired through frequent repetition and includes customary manners or practices of the user.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

As used herein "premise" refers to any building or structure or environs (interior or exterior) within which there are power draws, for example appliances and equipment. In one aspect, a premise is a residence. In another aspect, a premise is a commercial building or office or factory or institution.

As used herein "energy consumption device" should be interpreted broadly to refer to any device which either draws power or consumes energy.

As used herein "appliance" should be interpreted broadly to refer to any appliance which draws power within a premise, for example, a device, tools, a fixture (including light fixtures), an apparatus, an electrical socket etc. . . . As used herein, "power draw" or "drawer of power" refers to both power draw and/or energy consumption. It is to be understood that preferably, a sensor may measure, to perform load disaggregation on either or both of: power demand and energy consumption. Most smart grids mainly measure and record the "energy consumption" even though they are often capable of also measuring "power demand". The unit for power demand is often "kW", whereas for energy consumption it's "kWh" (power is to energy as speed is to distance).

In the present disclosure and claims, the word "comprising" and its derivatives including "comprises" and "comprise" include each of the stated integers but does not exclude the inclusion of one or more further integers or elements.

In essence, the present invention provides systems and methods of providing granular consumption information to users on "computing platforms" (including, but not limited to, mobile devices such as Smartphones, tablets, netbooks and laptops, as well as non-mobile personal computers). The granular consumption information described herein can be generated by for example, smart grid networks, or by custom electric consumption sensors (e.g. current sensors, etc.). There are also numerous ways to communicate the generated data to the end user. For example, this includes the use of the Internet, regional wireless communication methods, cellular networks, home networks such as Wi-Fi, broadband, Zigbee™, etc.

What the present invention provides is a presentation to a user of, rather than raw information, highly functional real time derivatives of such data, which comprise actionable information which can be used to maximize impact on a user's behavior in regards to power consumption.

It is well understood that Smart Metering technology is available and used today and such raw data produced by Smart Meters can readily be acquired by consumers. The method and system of the present invention adds value to that raw data and presents it in a highly functional and often real-time interactive manner to the user. In other words, there is provided a means: i) to provide to a user, within a premises, greater personal benefit by installation of the Smart Meter and ii) to provide, to utilities and power traders, granular power draw information and consumption data.

Load Disaggregation (LD)

As used herein, the term "load disaggregation" refers: the analysis of changes in the voltage and current going into a premise and deducing what devices/appliances are used in the premise as well as the individual energy consumption of each In literature, LD by definition means not using individual sensors for each device/appliance, but only looking at the aggregate consumption of a premise. The present invention provides a method by which a user is engaged (to switch a device on and off, as described herein) in order to a) assist in the LD calculation and 2) avoid the requirement of sensors on each device.

This is important for the following reasons:

1. Using the method and system of the invention, one can disaggregate a premise without having to build up a lot of historic data. That can take weeks and when a user gets a brand new system, he/she wants to be able to use it immediately, so that's an important advantage;

2. Using the method and system of the invention additional information is acquired from the user (e.g., name of appliances they have, isolated incidents of those appliances being turned on and off, etc.), which information can be extremely helpful for disaggregation;

3. Using the method and system of the invention, the accuracy of disaggregation is enhanced, with the collection/compilation of new data points (for example, isolated on/off incidents, name of appliances in the premise);

4. Existing algorithms, at time, may not be able to disaggregate properly at all because of lack of info such as list of existing appliances in a premise, but by using the method and system of the invention, it is possible to achieve LD in any premise;

5. The method and system of the invention are deployed with simpler algorithms and less processor-intensive software. This translates into efficiency and cost-effectiveness;

6. The method and system of the invention operates in real-time, which enables many applications for utilities and premise owners.

Load Disaggregation may also be referred to as Nonintrusive Load Monitoring or NILM.

So, in one aspect of the present invention, there is provided herein a method of capturing and cataloguing power usage such that it can be ascribed to a particular power draw (for example, an appliance). Without attaching power sensors onto every single appliance in a home, which is expensive and cumbersome, it is challenging to make a correlation between the raw power usage data and total load into individual appliances. Load disaggregation is assessed by the proprietary methods provided herein and therein used to determine the energy consumption of individual appliances by monitoring only the power demand of the total load. One aspect of the present invention is the ability to accurately load disaggregate without the need for multiple appliance sensors.

In another aspect, the LD data acquired thereby is applied to the methods and systems of power modeling and forecasting.

There are a variety of LD methods in the literature which attempt to estimate a breakdown of consuming appliances, in real-time or otherwise. Such algorithms may require superior hardware (e.g., higher sampling rates), sophisticated algorithms, a thorough database of all device pattern signatures, and an adequate computing platform. Alternative methods use specialized hardware, such as "smart plugs," to be installed on each appliance so that each appliance's consumption can be measured separately.

It is to be understood that within the method and system of the present invention, LD requires a smart meter or equivalent sensor device at the premise to measure an aggregate output signal from the premise but does not require appliance specific sensors. Disaggregation is achieved by way of a user directed and managed application, applying the proprietary method of the invention, as described herein. It is to be understood; however, that once LD data for a particular consumption device is acquired, catalogued and stored (i.e. a power profile for that device is created), additional user input with regard to that device is not required. Nonetheless, LD data for that device may be used to isolate power draws for other devices and to assist in all of the methods of predictions and forecasting as provided herein.

Analysis of Aggregate Signal—No LD Required

It is to be understood that not all method and systems of the present invention depend upon manual LD but rather, in other aspects, there is provided an analysis and breakdown of the aggregate signal from a premise. More particularly, this latter aspect of the invention involves. i) receiving said aggregated signal from a sensor; ii) collecting and recording the aggregate signal over a plurality of time resolutions and frequencies, iii) creating a predicted aggregate signal pattern for each time x and frequency y; vi) detecting changes in the predicted aggregate signal pattern at time x an frequency y (detected consumption pattern changes).

A good illustration of these two independent aspects of the present invention (manual LD analysis vs aggregate signal analysis) is as follows, with a notification system as an example:

user wishes to be notified when she has left some devices ON by accident (ex; a heater left one as user leaves a house)

non-LD dependent method and system of the invention looks at user's total home usage (say it reads 1200 watts) and compare that to her home usage when all unnecessary appliances are off (this is her 'baseline' consumption, in this example, 150 watts). So if her home reads 1200 watts instead of 150 watts while the user is leaving, a device is ON. Using the preferred application of the invention, the user will be immediately informed (preferably via mobile computing interface) about the reading and what it means.

A sample message might read "You're leaving your home but you have forgotten to turn everything off. Please go back and double check."

If an LD or Manual LD protocol was also in place in the above example, the user could have also been advised that "You're leaving your home but your heater is still ON. Please go back and turn it off." In other words, LD allows specific granular identification of the power consuming device.

The present invention provides, in one aspect, a system for acquiring and storing disaggregated power consumption data in a premises which comprises:

a) at least one sensor configured to measure at least one desired energy consumption variable associated with a plurality of energy consumption devices within the premises and to generate at least one aggregated output signal therefrom;

b) a data processor configured to receive said aggregated signal from the sensor; said processor comprising a means to create and update a power profile for each individual device, said data processor comprising a memory which comprises a catalogue of each of said individual devices and a respective power draw of each device.

It is preferred that the catalogue comprises a data set acquired by a process wherein one or more devices is independently switched between on-off, at least one time to isolate a power draw for said device from the aggregated signal. It is to be understood that there is no requirement for every single device within a premise to be turned on/off to isolate power draws. For example, a fridge can be easily identified without the user turning it on/off (which would be hard to do). In a further preferred embodiment, the catalogue comprises a data set acquired by a set-up process of a sub-set of devices, within a premise, wherein one or more devices with that subset is independently switched between on-off, at least one time to isolate a power draw from the aggregated signal.

With the scope of the invention, the method further comprises the step of acquiring a "delta" for a device within a premise (i.e. the difference between its off state and one state). The method further comprises, for a device, estimating a delta for a device, using ON-OFF-ON sequences (or OFF-ON-OFF) acquiring a start value and end value, and comparing the start value and end value to assess reliability of the estimated delta for the device.

Having extracted (and thus isolated) a subset of devices can improve the disaggregation of other devices as well.

It is preferred that the sensor is selected from the group consisting of a current sensor, a voltage sensor, a temperature sensor, an activity sensor, and an acoustic sensor. More than one type of sensor may be employed at a premise.

It is preferred that the system additionally comprises a communication interface configured for receiving user commands and queries, for requesting user input in respect to said devices and for transmitting information relating to the devices to the user. More preferably, the communication interface is selected from wired and wireless communication technologies. Even more preferably, the communication interface is selected from RS232, USB, Firewire™, Ethernet, Zigbee™, Wifi, Bluetooth™, RFJID, wireless USB, cellular, and WMAN communication technologies.

It is preferred that the processor as provided within the present method and system is configured within a mobile computing device. More preferably, the mobile computing device is selected from the group consisting of a smartphone, tablet, netbook and laptop computer. The processor as provided within the present system may be configured within an In-Home Display (IHD) platform or a home-energy management device (for example, some companies are offering their customers tablets for home control including energy management). Such devices are operable within the method and system of the invention.

It is preferred that the sensor is a Smartmeter. It is to be understood that this system and method will work with only one smart meter at the premises.

The present invention provides, in another related aspect, a computer implemented method of acquiring, cataloguing and storing power consumption data in respect to a first energy consumption device (with an energy draw) within a premises comprising a plurality of energy consumption devices which comprises:
a) providing a sensor configured to measure at least one desired energy consumption variable associated with the plurality of energy consumption devices (including the first device) within the premises and to generate at least one aggregated output signal therefrom;
b) configuring a data processor to receive said aggregated signal from the sensor;
c) creating a power profile for the first device by instructing a user, via a user interface, to independently switch said device between on-off positions ("switching set up"), at least one time, to isolate a power draw for said device from the aggregated signal, wherein data processor recognizes that the first device was selected and isolates a differential in the aggregate signal based on differing switch positions during the switching set up, said differential being the energy draw of the first device; and
d) providing a memory which recallably stores the energy draw of the first device in a catalogue.

It is preferred that step c) comprises a set-up protocol which is repeated for a plurality of energy consumption devices in the premises to create a catalogue of respective energy draws for each device. It is to be understood that the set-up protocol need only be done once for each device, with thereafter the catalogue comprising the respective energy draws for each device. Furthermore, as noted above, it is to be understood that there is no requirement for every single device within a premise to be turned on/off to isolate power draws.

It is preferred that the sensor is selected from a current sensor, a voltage sensor, a temperature sensor, an activity sensor, and an acoustic sensor. It is preferred that the data processor additionally comprises a communication interface configured for receiving user commands and queries, for requesting user input in respect to said device and for transmitting information relating to the device to the user. Such communication interface may be selected from wired and wireless communication technologies. More preferably the communication interface is selected from RS232, USB, Firewire™, Ethernet, Zigbee™, Wifi, Bluetooth™, RFJID, wireless USB, cellular, and WMAN communication technologies.

Preferably, the method of the present invention is implemented with a sensor which is a Smart Meter. Preferably, at step c) of the method described above, the device is toggled between on-off positions at the switching set up more than once.

It is preferred that the user interface employed within the method of the present invention provides a graphic representation to the user of the differential in power output between the toggled switch positions in respect to said device. The user interface preferably provides a graphic representation to the user of the differential and additionally comprises during switching set up, a prompt to the user to toggle the device between on-off positions up more than once in response to noise in the graphic representation.

Within the method of the present invention, noise is preferably removed by way of averaging or median calculation of the multiple differential measurements for the device i.e. repeated switching or toggling of device between on and off positions in response to demand by processor, via user interface.

The present invention provides, in yet another aspect, a power consumption and notification system comprises:
a) at least one sensor configured to measure at least one desired energy consumption variable associated with at least one energy consumption device within a premises and to generate at least one aggregated output signal therefrom;
b) a data processor configured to receive said aggregated signal from the sensor; said processor comprising a means to create and update a power profile for each at least said one device, said data processor comprising a memory which comprises a catalogue of each of at least said one device and a respective power draw of each such device, said data processor including a means to collect and analyze raw data in real time, from at least one of following sources: smart grid networks; current sensors; user inputs relating to user-defined budgets; user inputs relating to his behaviors and schedules; user inputs relating to the function and activities of the devices; other user information available through a networked device such as contacts, demographics, etc; GPS and other location signals such as WiFi network IDs, names and signal strengths; macrogrid outputs from within a population in which user belongs; television and radio signals; and memory based historical consumption data, said data processor including means to create communications to user based on information acquired from any of the sources; and
c) a user interface.

Preferably, real time is within a five minute interval or less.

Within one aspect of the present invention, there is provided a notification system wherein notifications are proactively presented to users, in a user interface, such notifications being generated by the analysis of raw data using the system and method of the present invention. In one respect, one component of the raw data is acquired by monitoring and analyzing user behaviors, and informing them of potential actionable information that presents them with immediate value, including saving potential, safety and security improvement, etc.

Another aspect of the present invention provides a means to engage users proactively in power measurement and monitoring. It is necessary to ensure minimum user effort and investment for harvesting the value of data. To require users to actively 'open' the application to receive feedback may be detrimental to that objective. Therefore, in a preferred form, notifications provided to a use, at any given user interface, are be used to provide the value to users proactively. The notifications are generated based on external events or user-configured internal schedules. The notifications may be generated by external processors and 'pushed' to the computing platform, or it could be the result of evaluations performed on the computing platform itself.

Applications on Mobile Devices

Mobile devices and networking technologies have transformed many important aspects of everyday life. Mobile devices, such as Smart phones, other cell phones, personal digital assistants, enterprise digital assistants, tablets and the like, have become a daily necessity rather than a luxury, communication tool, and/or entertainment center, providing individuals with tools to manage and perform work functions such as reading and/or writing emails, setting up calendaring events such as meetings, providing games and entertainment aspects, and/or store records and images in a permanent and reliable medium. The internet has provided users with virtually unlimited access to remote systems, information and associated applications.

As mobile devices and networking technologies have become robust, secure and reliable, ever more consumers are shifting paradigms and employing these technologies to undertake and create opportunities for meaningful data collection and use. It is within the backdrop that the system and method of the present invention was developed.

In a preferred aspect of the present invention, a user creates a power profile for an energy consumption device (for example an appliance) by way of an application on a mobile processing device which application may be pre-installed on mobile devices during manufacture or can be downloaded by users/customers from various mobile software distribution platforms, or web applications delivered over, for example, HTTP which use server-side or client-side processing (for example, JavaScript) to provide an "application-like" experience within a Web browser. Within the scope of the present invention, users of mobile processing devices download an application to enable the text/video/audio engagement, as described herein (the "PowerTab™" App).

To install a mobile device application, a user will typically either drag and drop an icon to the device or click a button to agree to the installation. Uninstalling one is also straightforward, and typically involves deleting or dragging the icon away from the device. When a user uninstalls a mobile device application, he or she may also lose all the data relating to it because, in many cases, it is not stored separately. The number of applications that can be installed on a single phone depends on the phone's memory.

In another embodiment, the system and method according to the invention may be used with a web site operated on a server, accessible over the Internet by users using computer systems, who may upload data, search, view and post content on the web site and have an ability to view content posted on the web site by other users of the application.

The web site is a collection of web pages, hosted on one or more servers. Users typically connect to web site on the Internet using hyperlinks, also referred to as links. By clicking on a link, a user directs a browser operating on computer system to open a window on the monitor of the computer system showing the web site associated with the link. Typically users must register with web site.

Such a registration system may include obtaining information about the user such as his/her name, email address, geographic information, such as address, or country of residence, and the like. Once registered, users can log on to web site using a user name and password, which are provided by server or selected by the user on registration. The user will also be provided a personal web page at web site at which they can upload and display content, preferences and their data related to his/her premise.

Preferably, the server has a database which stores the web site, the content thereon, associated web pages, records about each user and the content, and information about each link. When a user visits the home page, they may log in, if they are a registered user. If they are not a registered user, they may be unable to access certain features of the web site, but server records the IP address of the unregistered user, and offers the unregistered user an opportunity to register.

While there are likely other smart-grid apps in the market with smartphone notification features, the system and method of the present invention differ in that they preferably provide:

Proactive notifications to provide users with budgeting feedback. Using algorithms as provided herein, user's real-time consumption can be evaluated within the objective of a user-defined desired budget, and feedback could be provided to users to indicate over consumption (negative feedbacks) or achievements (positive feedbacks).

Proactively reminding users if they have accidentally left an appliance/device on, when they leave their house. The feedback to user can include any or all of the following: a breakdown of the devices left on by accident, the consequences of it in terms of dollars or environmental effects, etc. . . .

Additional data such as a users 'away' hours based on their usual consumption may be determined and such data acquired, stored and analyzed, based upon, for example, the monitoring of specific triggers in real-time consumption to perceive whether users are about to leave or have just left home, or by requesting additional information from users, or by considering additional information available on user's computing platform. This latter includes GPS signals for instance. In particular, one preferred power external signal is the Wi-Fi range and availability, which could accurately estimate user's position with regards to their home. All of the above information can be used independently or together inside a probabilistic platform to improve detection accuracy.

All of the above analyses may be implemented on a mobile computing platform, or on a remote server and then pushed to the mobile platform.

A user is informed using the notifications, as he prepares to leave a premises, is about to leave, or has recently left.

A user can be proactively informed of devices he has left on when he goes to bed. Data is incrementally gathered (on for example, typical Monday to Friday sleep and waking periods of a user) and it is thereafter possible to learn a user's bedtime behaviors based on the consumption data, or through data acquired directly or indirectly from the mobile platform (e.g. platform being docked or plugged in which often occurs at the bed table, an alarm being set, etc.).

Other than excess consumption, leaving devices on by accident could have safety ramifications. Items such as clothing iron, hair iron, oven, etc. could cause various damages if left on by accident over an extended period. The notification system in this app can be used to inform users of such mistakes and warm them of possible consequences.

Using home automation systems, the intelligent algorithms used in implementing the method of the present invention can be used not only to provide notification to users, but also to act automatically or based on user response to turn off devices if necessary.

Using home automation systems, the intelligent algorithms used in implementing the method of the present invention can be used not only to provide notification to users, but also to provide notifications to other appliances and devices regarding the user behavior: e.g., turn on the coffee maker when the user wakes up in the morning, or adjusting thermostats as user wakes up, leaves home, or is about to return home Notifications on a mobile platform could also be used for providing security feedback to users. Unusual changes in consumption when users are expected to be away could be an indication of intrusion. The user could be away for work, or away for an extended period for holidays, and could set this feature as an additional security warning. This, too, can be presented to users via notification, or it could be provided to them via text messaging, email, or other forms of communication. It could also be used to complement existing security systems by providing them with additional indicator signals.

The detection of various events similar to ones discussed above could be a source of information that is shared with other applications on the computing platform, or sent over the internet to be used for other services.

As an alternative to "external notifications", consumption feedback in accordance with the present invention can be provided to users using spaces on any particular interface with which they most frequently interact. This includes a home screen, a lock screen on mobile platforms, notification bars at the edges of a screen, to name a few. The information within these spaces is made available to users proactively as they use their computing platform, without requiring users to open any specific application. Examples include home screen widgets. Another example is using simple visual cues such as changing the color of the time or clock text/icon on the screen, to reflect the current electricity rate in Time-of-Use Billing regions. For instance, a high-temperature color (e.g. red) on the clock could indicate high cost of consumption, or current high consumption by user, or user exceeding budget, or a combination of those.

Device Interface

FIG. 1 illustrates a graphic representation of a preferred user interface "front page" 10 presenting easy to read consumption data to users. A center meter 12 depicts power consumed to date 14, hourly use information 16 and budget target pointer 18. The latter may be manipulated and dynamically updated by user as desired.

Device Profiling

While there are numerous hardware tools to estimate electronic device consumption/cost, the method and system of the present application requires no device-specific hardware and relies solely on granular consumption data. The method involves monitoring the changes in real-time consumption rate, and correlating that to specific appliances using limited user input, and finally presenting the information to user in actionable and understandable ways.

There are a variety of 'load-disaggregation' methods in the literature which attempt to estimate a breakdown of consuming appliances, in real-time or otherwise. Such algorithms often require superior hardware (e.g., higher sampling rates), sophisticated algorithms, a thorough database of all device pattern signatures, and an adequate computing platform. Alternative methods use specialized hardware, such as "smart plugs," to be installed on each appliance so that each appliance's consumption can be measured separately. Attaching smart plugs to all devices in a premises could cost thousands of dollars.

The value of this work is its ability to accurately estimate individual device consumptions with minimum data samples, and by taking advantage of simple and quick inputs from the user. No additional hardware or sophisticated computing is required beyond the one metering sensor. The method of the present invention is implemented on mobile platforms to allow users to quickly 'catalogue' their household (devices and the energy draw of each device) using a simple and user friendly means.

A user is provided with a 'device profiling' wizard that provides a means to catalogue some or all devices within a household (also referred to herein generically as a "premises") by estimating consumption of a set of devices. As used herein, the term "wizard" is a coined term to refer to the combination of at least the processor, interface and memory, in accordance with the system of this invention The wizard, in a preferred form, requires the user to turn the device switch on at least once and in some instances multiple times, to allow the algorithm to observe the consumption changes caused by the device. Alternatively, the wizard could be triggered automatically when noticeable consumption changes are observed, to ask user to identify the source.

The wizard process can also ask users for a limited set of additional information such as device classification, or more detailed information such as timing and length of the periods of usage of the device (e.g., minutes and hours per day, days per months, etc.).

Consumption rate is monitored continuously in real-time, to observe changes made by individual devices. The consumption data could be taken multiple times per second, or as few as once every few minutes. The data may be communicated to the computing platform in real-time or with delay, one at a time or in bursts.

Referring to FIGS. 2A-F, the sequential steps of device set up are illustrated. An oven is selected as the device to profile in interface pane of FIG. 2C and the system previous to such selection, had prompted user to turn the switch of the device at interface pane of FIG. 2A. Between panes of FIGS. 2A and 2D where the use is instructed to turn switch again, system communicated with sensor and acquired power reading measurements from a sensor such that a differential reading of input between steps of FIGS. 2A and 2D could be attributed to the power draw of the oven.

Figure 2A:
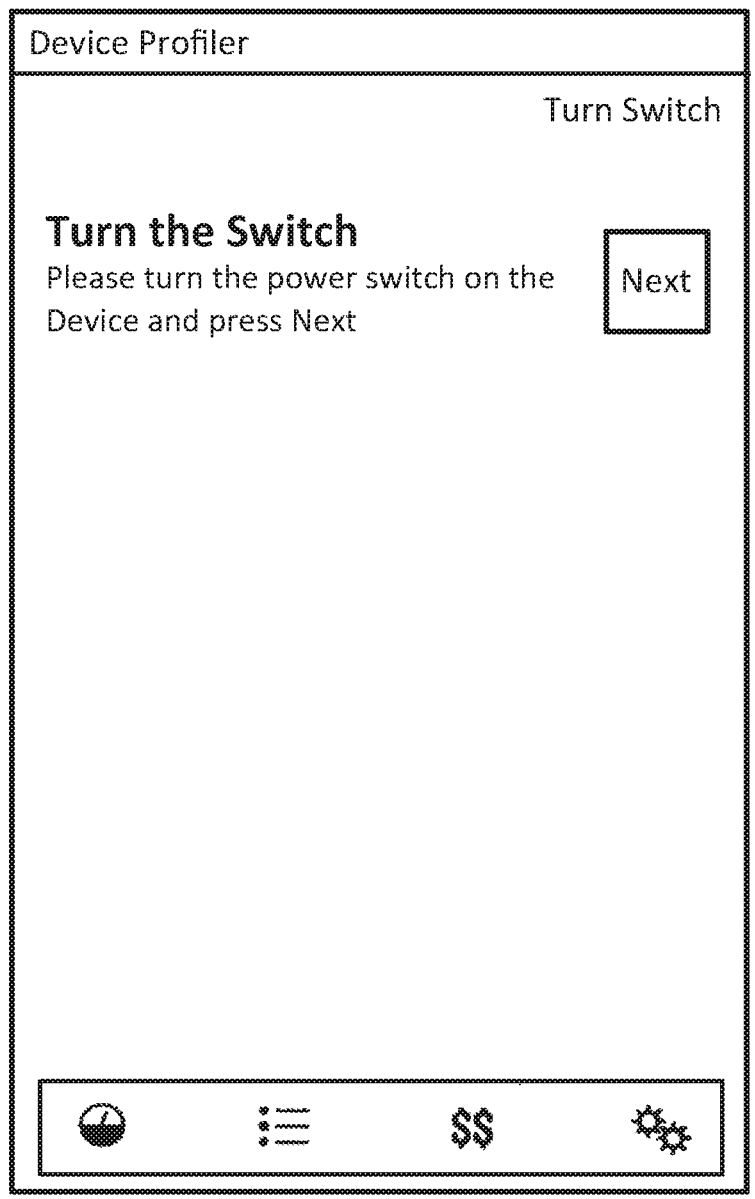
FIGS. 2A, 2B, 2C, 2D, 2E and 2F are schematics showing a sequence of six user interface smartphone dashboards which sequentially illustrate the switching set up for an oven.
Figure 2B:
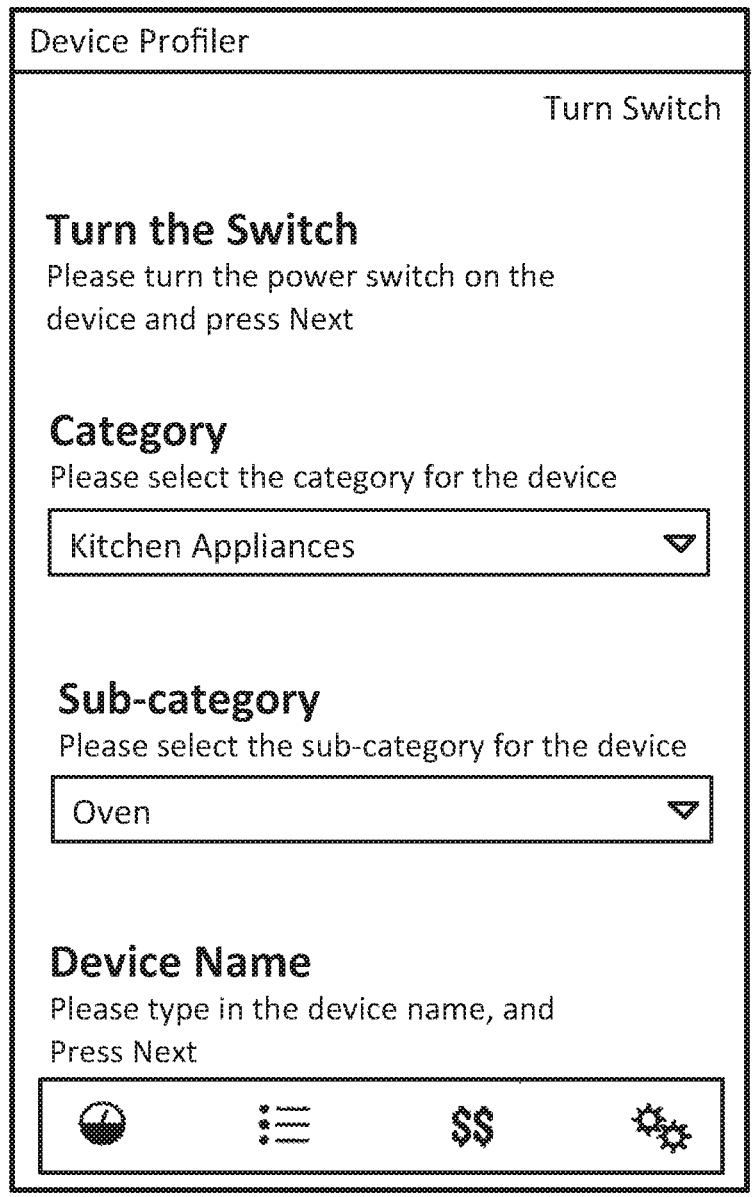
Figure 2C:
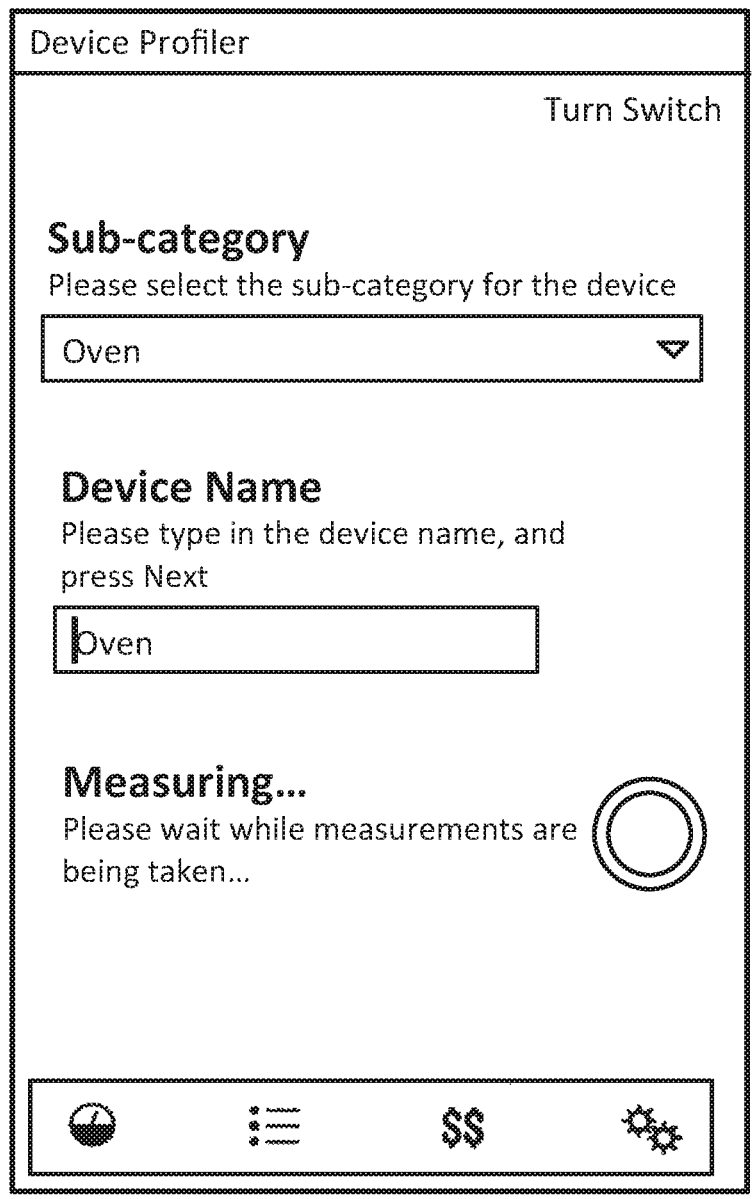
Figure 2D:
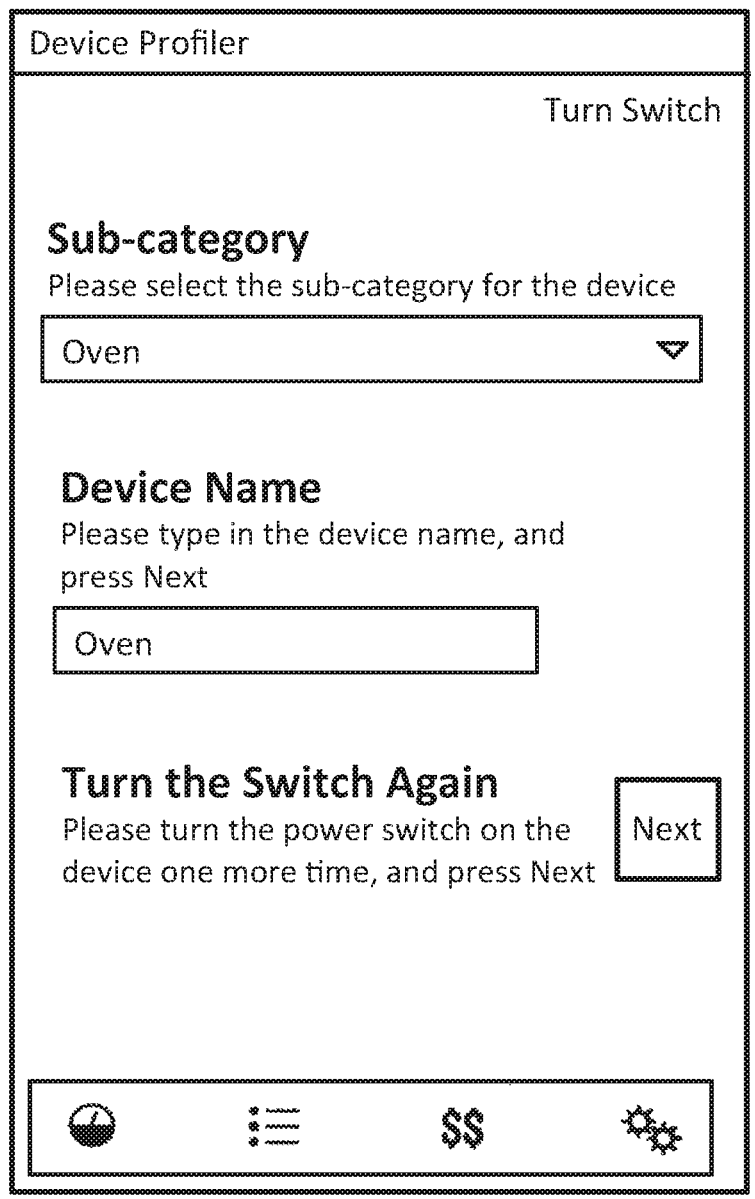
Figure 2E:
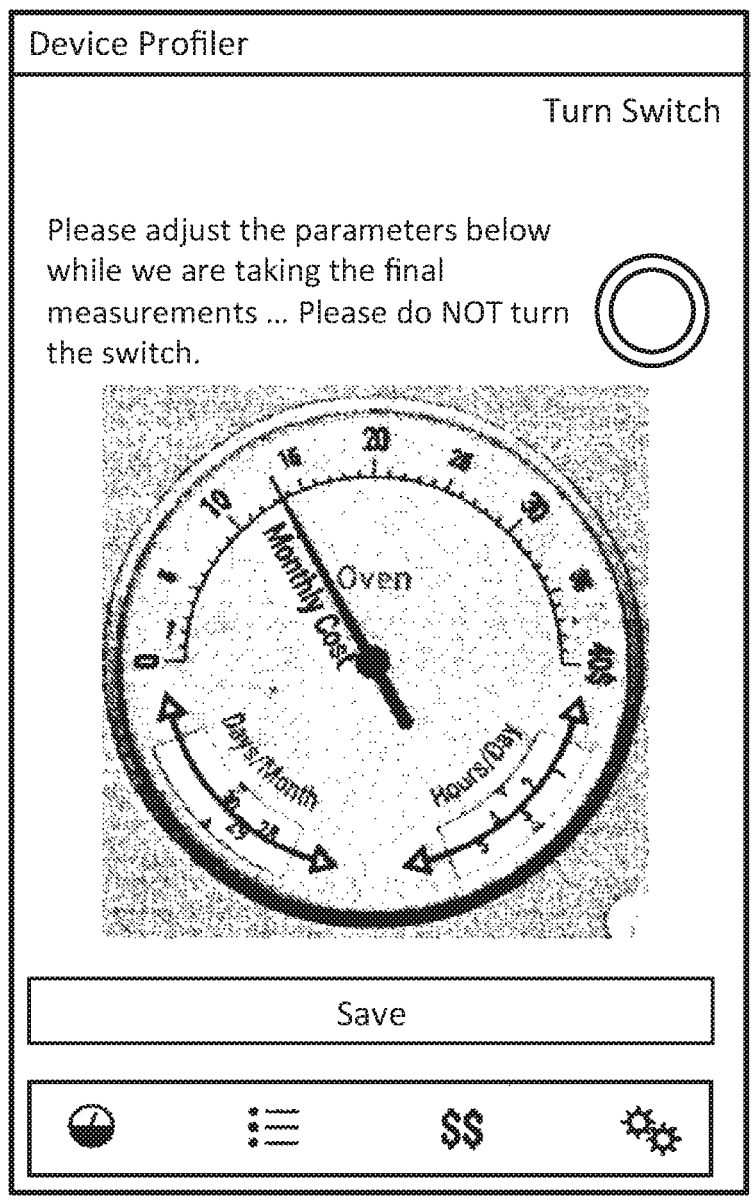
Figure 2F:
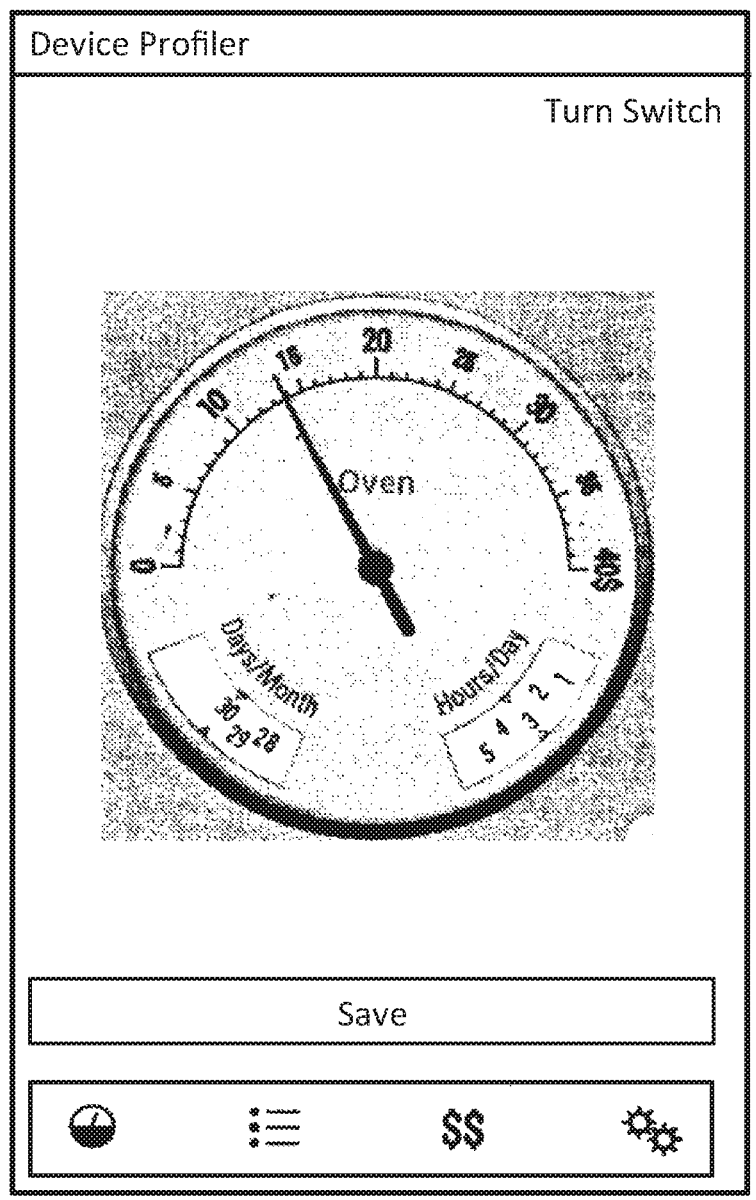
Figure 3:
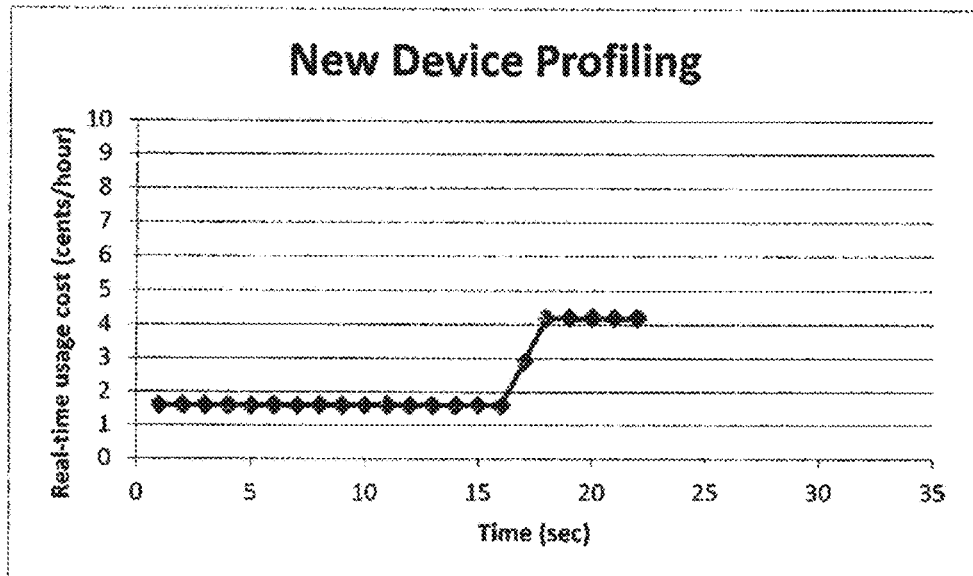
FIG. 3 is a graph showing real time usage of a device over time in a new device profile i.e. when device switched by user for first time.

In operation, at FIG. 2A the application (app) wizard prompts the user to turn the device switch for the 1st time. At FIGS. 2B and 2C, the app wizard prompts user to input device information while real-time consumption measurements are being taken in the background. At FIG. 2D, the app wizard prompts the user to turn the switch for a 2nd time. At FIGS. 2E and 2F, the user is requested to confirm device usage info estimated based on device category, while the app takes final usage measurements. Once user inputs the information and final usage measurements are taken, user can save the result into his/her catalogue Referring to FIG. 3, there is depicted a real-time usage graph showing usage cost after user turns a device on for the first time.

Figure 4:
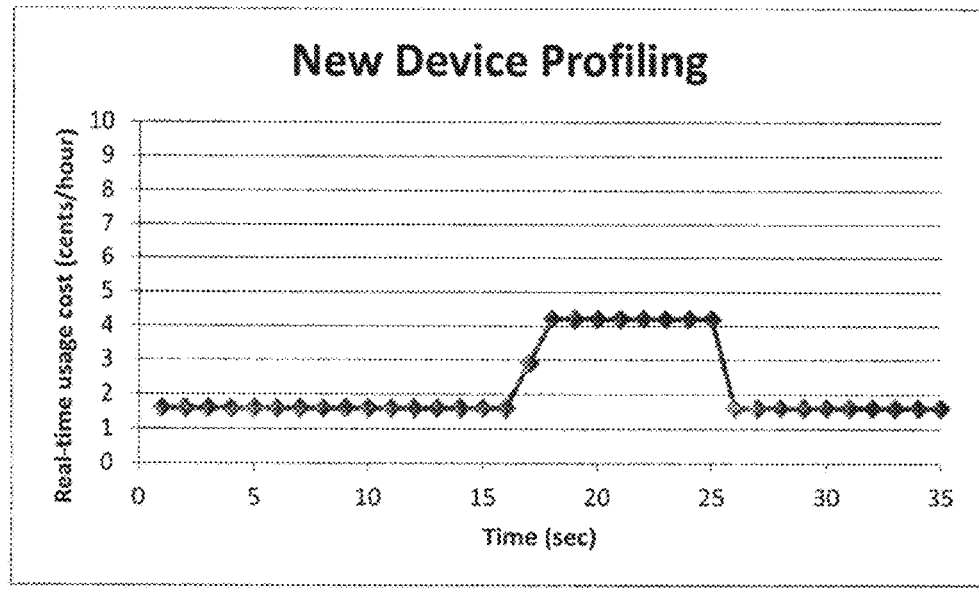
FIG. 4 is a graph showing real time usage of a device over time in a new device profile i.e. when device switched on and then off by user.

Referring to FIG. 4, it can be seen that a user could turn the switch once or multiple times to provide additional information for improving accuracy and reliability of the resulting estimate. The step of turning a device on and off at least once is referred to herein as "switching set up". The user may be asked to confirm when the switch is turned, in order to provide the system with more information to help it identify the consumption changes of interest, and associate them with the user-intended device. Alternatively, the system could also monitor and detect sudden consumption changes, and avoid asking user for flagging the timing. This helps simplify the process for user.

There are a number of measures, which can be implemented fully in accordance with the present invention, to evaluate the confidence and accuracy in the resulting device consumption estimate. The confidence result can be reported to user, or can be used to compensate for the error, or to discard the unreliable device cost estimation results.

Figure 5:
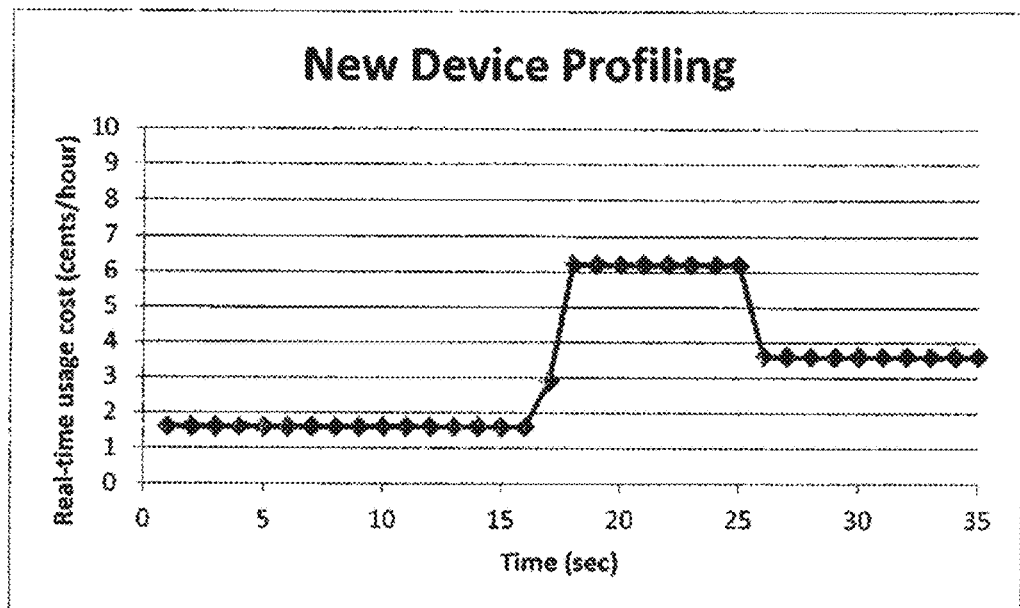
FIG. 5 is a is a graph showing real time usage of a device over time in a new device profile i.e. when device switched on and then off by user, but showing unreliability.

One way to estimate reliability of the a) the information regarding the energy draw of a selected device and b) the device cost estimation, is by an additionally step of having user to turn device switch more than once. Observing multiple triggers helps the system observe consistency in the measurements, and use averaging to remove noise, etc. The scenario in which an unknown device is turned on—unintentionally—while the device profiling Wizard is in progress, is illustrated in FIG. 5. As a result, the usage measurements before turning the device on are not the same as when the device is turned back off again. This inconsistency shows lack of reliability in the cost estimation results. In accordance with a preferred method of the present invention, this problem is addressed by input of multiple triggers during switching set up.

Figure 6:
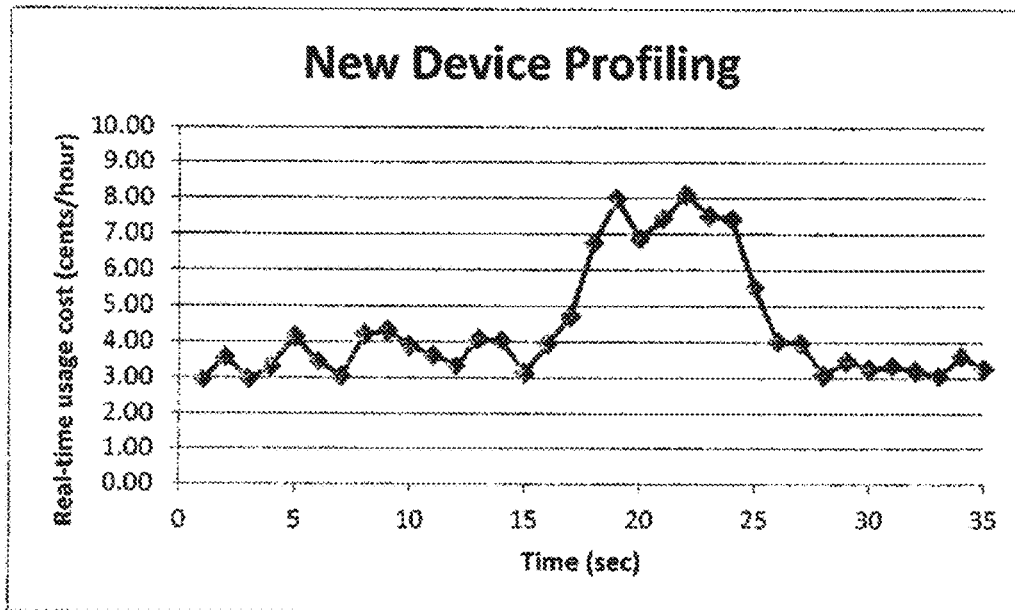
FIG. 6 is graph showing real time usage of a device over time in a new device profile i.e. when device switched on and then off by user, but showing challenge in observation due to noise.

FIG. 6 illustrates another way to evaluate the reliability of such cost estimation wherein noise and deviation in the measurement data is evaluated before and/or after the device profiling Wizard process. Noisy environment can be reported to user, or the potential accuracy in the device cost can be presented, or the Wizard can disable new device profiling process in presence of excessive noise, or finally, the Wizard can take additional measurement samples in order to compensate for the noise using noise removal techniques such as averaging or median. A noisy environment is demonstrated in FIG. 6 in for the same scenario presented previously.

Statistical formulations can be used to remove noise and outliers in the measurements. In addition, probabilistic frameworks are used to evaluate exact timings at which the device is triggered and associate that with the device that the user intended to evaluate.

Figure 7A:
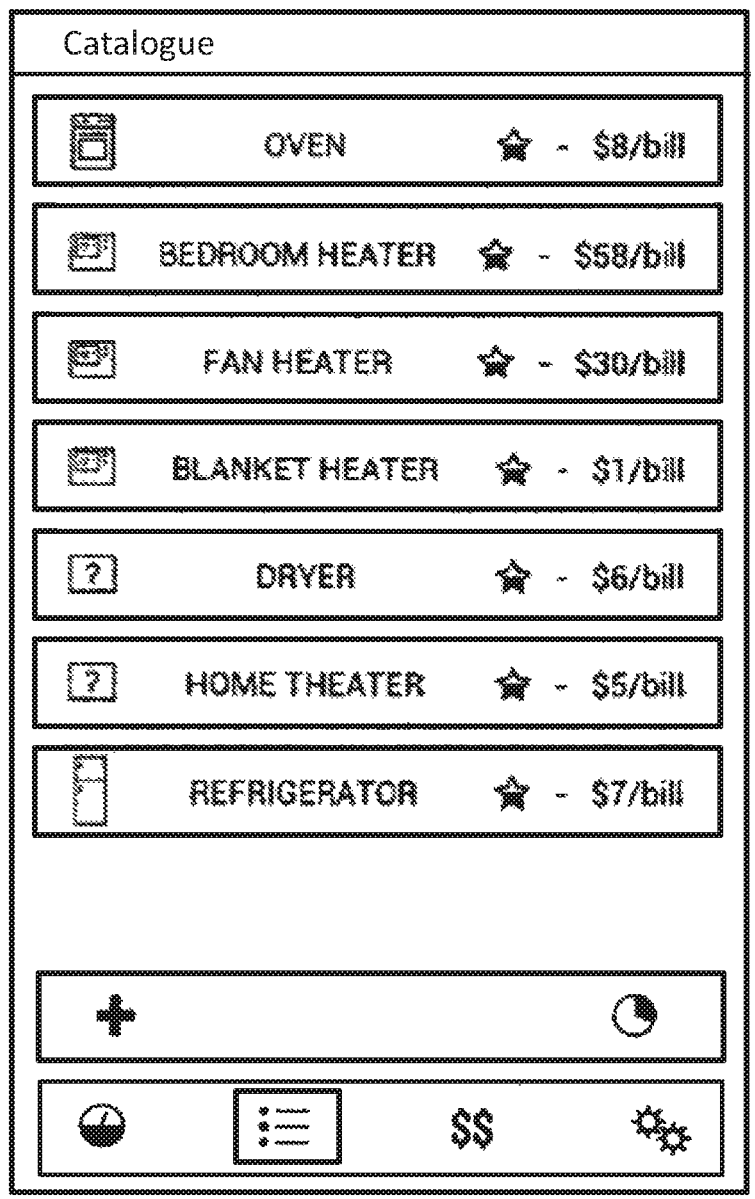
FIGS. 7A, 7B and 7C are schematics showing a sequence of three user interface smartphone dashboards which illustrate device catalogue screenshots.
Figure 7B:
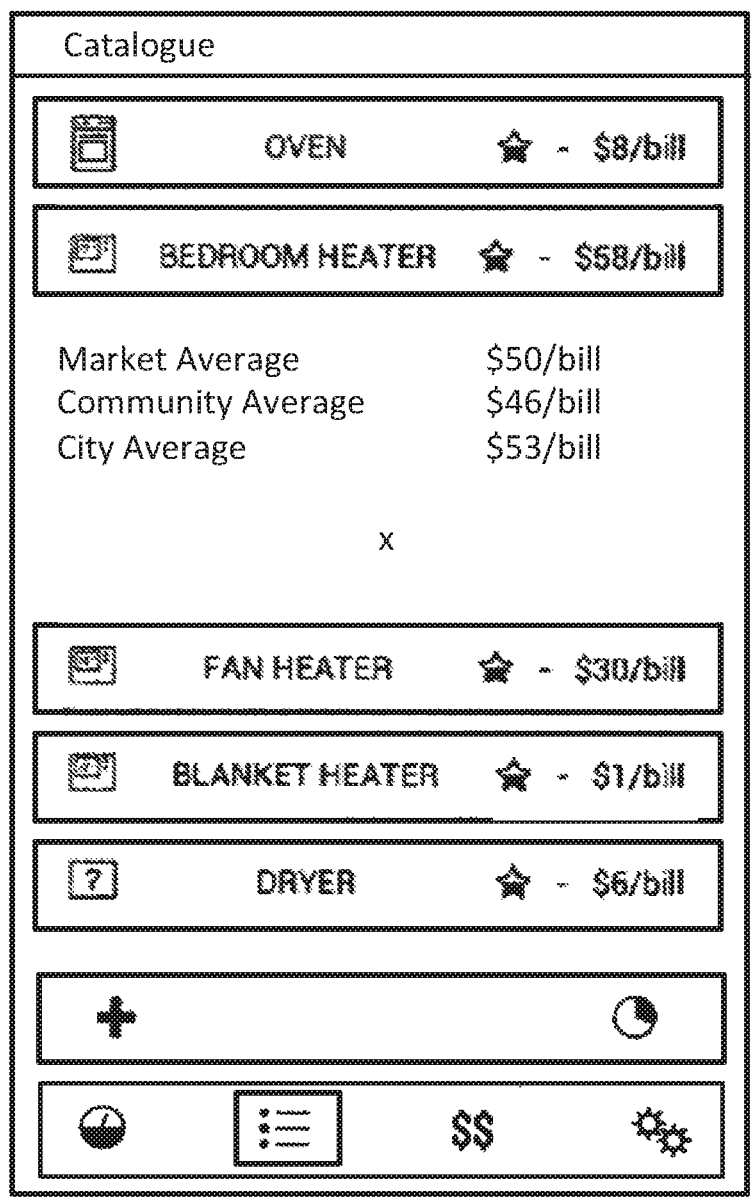
Figure 7C:
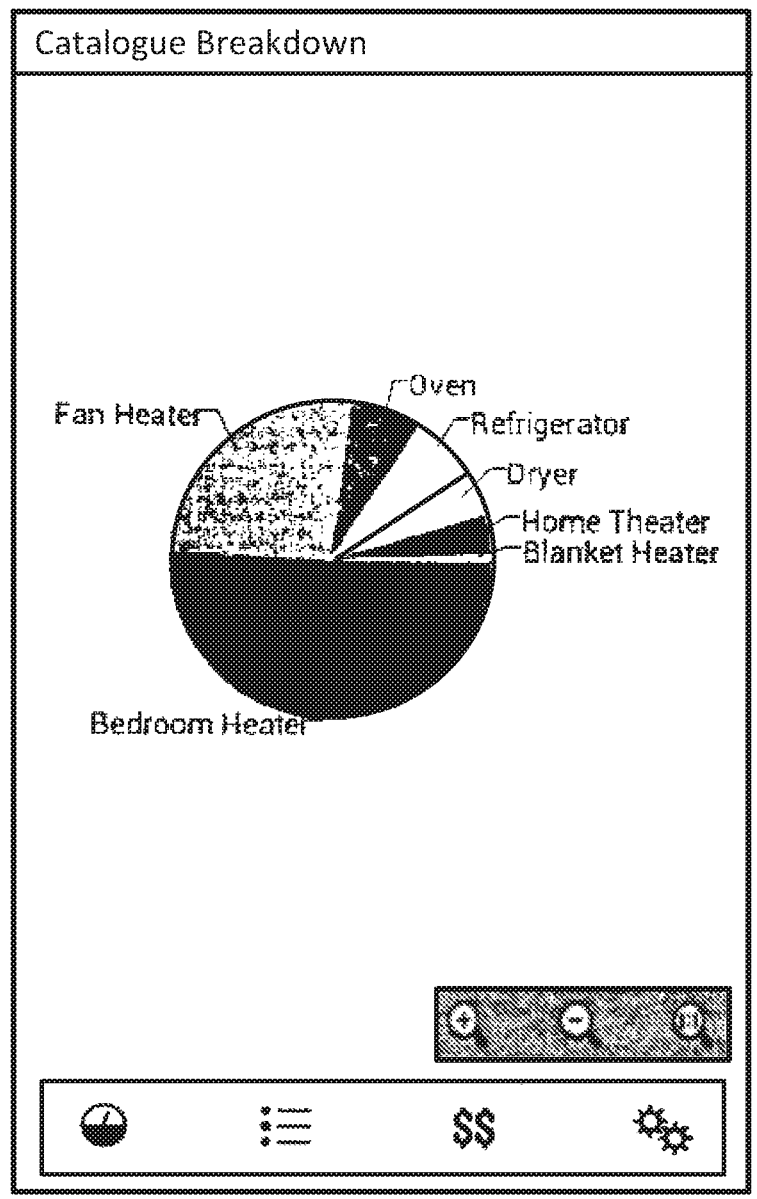

FIGS. 7A-C illustrate an interface showing the cataloguing of devices/appliances wherein FIG. 7A shows a list of all profiled devices and their consumption; FIG. 7B shows specific social information can be presented about each device (e.g., how much the community pays on average for the energy usage of a similar device) and FIG. 7C shows an alternative graphical representation for the catalogued devices.

Cataloguing

Using the aforementioned Device Profiling process, users can create a snapshot of their household consumption by estimating consumptions of multiple devices. This is referred to as cataloguing. The result of the Device Profiling process can be presented to users using understandable graphical representations such as pie charts, etc. The representations can demonstrate the breakdown of the current real-time consumption rate, or the breakdown of utility bills, or the breakdown of daily, monthly or annual consumption/spending, etc. Environmental metrics can also be used.

The cataloguing data can be used in a social context, by permitting users to share info with others. Additionally, the social component can be used to provide further actionable and understandable feedback to users by performing comparisons to neighbors, community, and friends.

Figure 8:
FIG. 8 is a schematic showing a user interface Smartphone dashboard which illustrates opportunities for marketing and promotion in conveyance of information to user.

FIG. 8 illustrates that the cataloguing information can be used for consumer analytics such as defining and classifying user demographics, modeling user consumption behavior, consumer bill/consumption forecasting, etc. . . . Home cataloguing can also be used for large scale analytics—utilities, power traders, regulators. For example, the house cataloging information and the resulting refined demographic classification can be used in demand load forecasting and regional usage breakdowns.

The additional information generated by the user through the home cataloguing process can be used to for target advertisement and communication, by retailers, utilities, governing bodies, etc. to offer product, services, promotions or education to specific class of users with clear need or interest.

Social

A social aspect and application of the method and system of the present invention involves using information gathered about a user of the application to create more value by presenting data in more tangible and actionable ways. The user data is driven from their consumption habits, mobile computing information, or direct inputs by the user in the app. Following use cases showcase the potential applications for this:

Connect users to people in similar regions or demographics, to exchange information on consumption and saving.

Gather user generated content (articles, comments, questions, feedback), as well as professional content, and present them to users based on intelligent targeting strategies (e.g., based on user profile, demographic, consumption, and even home catalogue information). For instance, a user with high heating consumption is presented with suggestions and feedback from other users who successfully reduced their high heating consumption.

Show how other users in one's community, city, demographic or social circle consume power (overall or time and device specific), as well as how and why some do better than others.

By complementing existing popular events such as Earth Day, or by introducing new similar collective experiences, users are formed into a collective and their affect is made visible and tangible to them using the information gathered by the app. The collective includes users own social peers or complete strangers from outside their network or community. The app provides users with a feedback on en-masse movements to reduce consumption or improve behavior. This could include real-time feedback as events like Earth-day occur, to demonstrate the en-masse savings and conservation, the environmental impact, etc.

Similar to above,

Connect users to people in similar regions or demographics, to exchange information on consumption and saving.

Gather user generated content (articles, comments, questions, feedback), as well as professional content, and present them to users based on intelligent targeting strategies (e.g., based on user profile, demographic, consumption, and even home catalogue information). For instance, a user with high heating consumption is presented with suggestions and feedback from other users who successfully reduced their high heating consumption.

Show how other users in one's community, city, demographic or social circle consume power (overall or time and device specific), as well as how and why some do better than others.

Furthermore, a basic social application will assist users in shared-living spaces, to create collective conservation objectives, to identify consumption sources and to split bills.

Aggregated Analysis

In addition to real-time or near real-time user consumption with a frequent sampling interval, a mobile or tablet platform application may capture additional user information that could be useful for data analytics on a larger scale. The information includes—but is not limited to—name and address, age, sex, location, contacts, etc. Such information can be used for creating more accurate demographic profiles and to classify each user under the appropriate profile. The profiling of user demographics and the specific user information can be used in addition to the user consumption data, to create more accurate consumption models and forecasts, and to provide feedback to third parties such as utilities, power retailers, power traders, etc. All the above data from a sampling of users in a community can be used to create regional and aggregate data analytics for various analytics applications such as load demand forecasting, energy theft, etc.

Data Acquisition

New smart meter technology is rapidly being introduced to the industry to facilitate time-of-use metering at residences, permitting utilities to charge for electrical usage dependent upon the time of use and for consumers to take advantage of times at which a lower cost is assessed to the use of electricity. The means to measure at least one desired energy consumption variable associated with a plurality of energy consumption devices within the premises and to generate at least one aggregated output signal therefrom is preferably be a smart meter.

In one aspect, the system and method may be implemented using a mobile computing device which aggregates and analyzes data from a smart meter or other similarly functioning sensor product and enables viewing of the compiled and enhanced data by a viewer via an interface. In one aspect, the system additionally comprises one or more network managers which aggregate and relay the data from a data storage system to a server and wherein said server enables viewing of the data by a viewer via an interface and wherein said interface is selected from the group consisting of a desktop computer, a laptop computer, a hand-held microprocessing device, a tablet, a Smartphone, iPhone®, iPad®, PlayBook® and an Android® device. Those skilled in the relevant art will appreciate that the invention can be practiced with many computer configurations, including hand-held devices, multiprocessor systems, microprocessor-based or programmable consumer electronics, personal computers ("PCs"), network PCs, mini-computers, mainframe computers, and the like. In one aspect, the measurement data is communicated wirelessly on a peer-to-peer network to a central network manager. In one aspect, the measurement data is collected in situ from network managers or sensors including but not limited to current monitoring sensors that are used to estimate power consumption. This can be achieved by workers on site either on the ground or using a bucket truck. In one aspect, the system comprises more than three sensor nodes. In one aspect, the system may be temporarily field deployable on one or more supply line electrical wires and then moved and reset on other supply line electrical wires without the requirement of any wire splicing for such deployment and re-deployment.

Within the scope of the present invention, data acquisition, compilation, and analysis may preferably be controlled by a computer or microprocessor. As such, the invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented. In particular, this is germane to the network managers, which aggregate measurement data and downstream to the servers which enables viewing of the data by a user at an interface.

Although not required, embodiments will be described in the general context of computer-executable instructions, such as program applications, modules, objects or macros being executed by a computer. Those skilled in the relevant art will appreciate that the invention can be practiced with other computer configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

A computer system may be used as a server including one or more processing units, system memories, and system buses that couple various system components including system memory to a processing unit. Computers will at times be referred to in the singular herein, but this is not intended to limit the application to a single computing system since in typical embodiments, there will be more than one computing system or other device involved. Other computer systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

A computer system includes a bus, and can employ any known bus structures or architectures, including a memory bus with memory controller, a peripheral bus, and a local bus. The computer system memory may include read-only memory ("ROM") and random access memory ("RAM"). A basic input/output system ("BIOS"), which can form part of the ROM, contains basic routines that help transfer information between elements within the computing system, such as during startup.

The computer system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although a computing system may employ hard disks, optical disks and/or magnetic disks, those skilled in the relevant art will appreciate that other types of non-volatile computer-readable media that can store data accessible by a computer system may be employed, such a magnetic cassettes, flash memory cards, digital video disks ("DVD"), Bernoulli cartridges, RAMs, ROMs, smart cards, etc.

Various program modules or application programs and/or data can be stored in the computer memory. For example, the system memory may store an operating system, end user application interfaces, server applications, and one or more application program interfaces ("APIs").

The computer system memory also includes one or more networking applications, for example a Web server application and/or Web client or browser application for permitting the computer to exchange data with sources via the Internet, corporate Intranets, or other networks as described below, as well as with other server applications on server computers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such those available from Mozilla and Microsoft.

The operating system and various applications/modules and/or data can be stored on the hard disk of the hard disk drive, the optical disk of the optical disk drive and/or the magnetic disk of the magnetic disk drive.

A computer system can operate in a networked environment using logical connections to one or more client computers and/or one or more database systems, such as one or more remote computers or networks. A computer may be logically connected to one or more client computers and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, a computer is connected to the LAN through an adapter or network interface card (communicatively linked to the system bus). When used in a WAN networking environment, a computer may include an interface and modem or other device, such as a network interface card, for establishing communications over the WAN/Internet.

In a networked environment, program modules, application programs, or data, or portions thereof, can be stored in a computer for provision to the networked computers. In one embodiment, the computer is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances a computer will operate automatically, where an end user application interface is provided, a user can enter commands and information into the computer through a user application interface including input devices, such as a keyboard, and a pointing device, such as a mouse. Other input devices can include a microphone, joystick, scanner, etc. These and other input devices are connected to the processing unit through the user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computer can include other output devices, such as speakers, printers, etc.

It is to be understood that the method and system of the present invention include not just the aforementioned benefits of simple and inexpensive device disaggregation, power consumption monitoring, user-friendly notifications and power data monitoring. Within another key aspect of the present invention, methods and systems of smart budgeting are provided. So, the present invention further comprises a budgeting method and system which allows each user to specify a target budget for their billing period. The analysis provides users with real-time feedback as to whether their consumption habits are likely to meet their desired budget.

The simplest way to approach budgeting is to divide the total budget by the number of hours in the billing cycle, and inform the user when their hourly consumption goes beyond the pre-defined hourly budget. However, this method would not provide users with much beneficial feedback because the users require different amounts of electricity at different hours and days. For instance, if the amount of allocated budget for 5 PM is the same as 5 AM, the user will always appear to be over-consuming (i.e., consumption>budget) at 5 PM, and under-consuming (i.e., consumption<budget) at 5 AM.

The Smart Budgeting (SB) method and system as described herein, on the other hand, provides users with a more intelligent and practical feedback. At each hour, the allocated budget is determined using the following variables:

a) How much of the budget is left to be consumed (subtract the money spent so far in the billing period, from the total budget).

b) The forecasted consumption for this day and hour.

c) The total forecasted consumption in the remaining portion of the billing cycle.

d) The observed deviation in user's consumption for the current day and hour.

The Smart Budgeting system and method of the present invention is capable of taking into account the fact that hours with higher consumption amount and higher consumption deviation represent better opportunities for users to conserve energy.

In operation, Smart Budgeting in accordance with the present invention may be illustrated (by way of example) as follows:

The given data for analysis:
The closing date of the billing cycle
Hourly readings of user's consumption over the previous months Performance Evaluation Running the algorithm over user's previous months of consumption, the algorithm performance can be measured by comparing the forecast value to the actual billing cost of the corresponding period.

$$B_R = \sum_{i \in P} C_i$$

$$B_F = \sum_{i \in P} F_i$$

$$e_P = |B_F - B_R| = \left|\sum_{i \in P}(F_i - C_i)\right|$$

where C is the hourly consumption, F is the hourly forecast, $B_R$ is the real billing cost, $B_F$ is the forecasted bill, P is the billing period, and $e_P$ is the forecast error of the given period.

Choosing different billing cycle closing dates would result in different error values. Herein provided is a performance evaluation method in which the outcome depends only on the forecast algorithm itself, and not the billing period. Hence, the present method uses the above method over all possible billing periods (i.e. starting at every single day in the entire data):

$$PI = \sum_{\forall P \in \{C\}} e_P$$

where PI is the Performance Index. The lower the PI, the more accurate the forecast algorithm.

The PI can be calculated for all available load profiles. Whether designing, improving or comparing forecast algorithms, the ultimate intention is to minimize PI which in turns leads to more accurate forecast bills.

PI can be obtained for different billing cycle lengths (e.g. a week long, a month long, or a two month billing cycle). In general, it has been observed that as the billing cycle grows the PI increases exponentially.

It is worth noting that the forecast made at the beginning of a two-month billing period is basically the worst case scenario and it is likely to create the most inaccurate result. As the time moves forward, the length of the period over which we forecast shrinks, and the length of the time for which actual readings are used grows. Consequently, by the end of the billing period, the value presented as "forecast bill" consists mostly of actual readings rather than forecast values. Therefore, the accuracy increases as the time passes.

Principles

Based on the examined household load profiles, it can be shown that there are very little common behavioral features among different electricity users. However, a single user does demonstrate behavioral patterns over the course of time. The objective of the forecast algorithm, as applied within the system and method of the invention, is to utilize a pattern recognition system to exploit this fact. Hence, an unsupervised learning approach is suggested based on statistical analysis.

Figure 9:
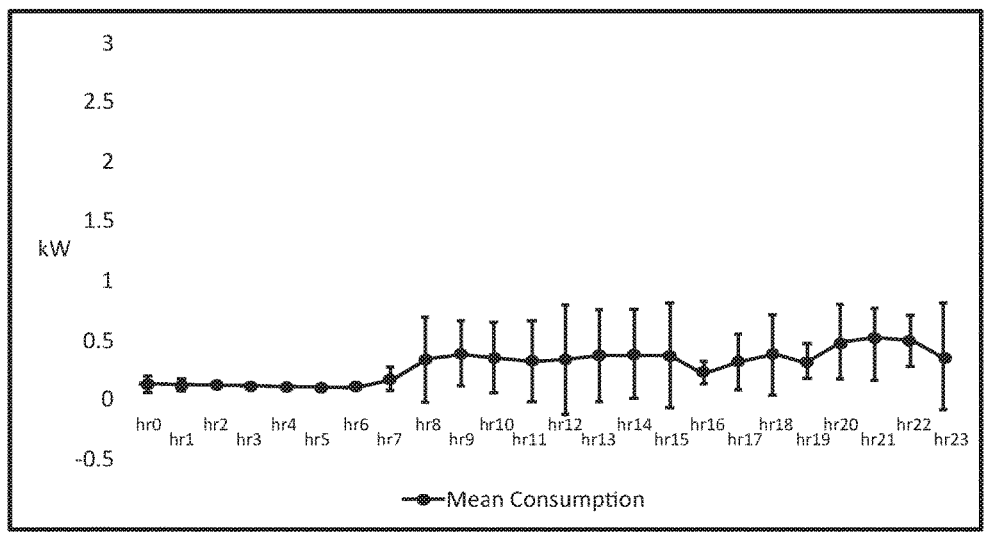
FIG. 9 is a graph showing the Mean and Standard Deviation over Period Length of One Day and Time-Resolution of One Hour.
Figure 10:
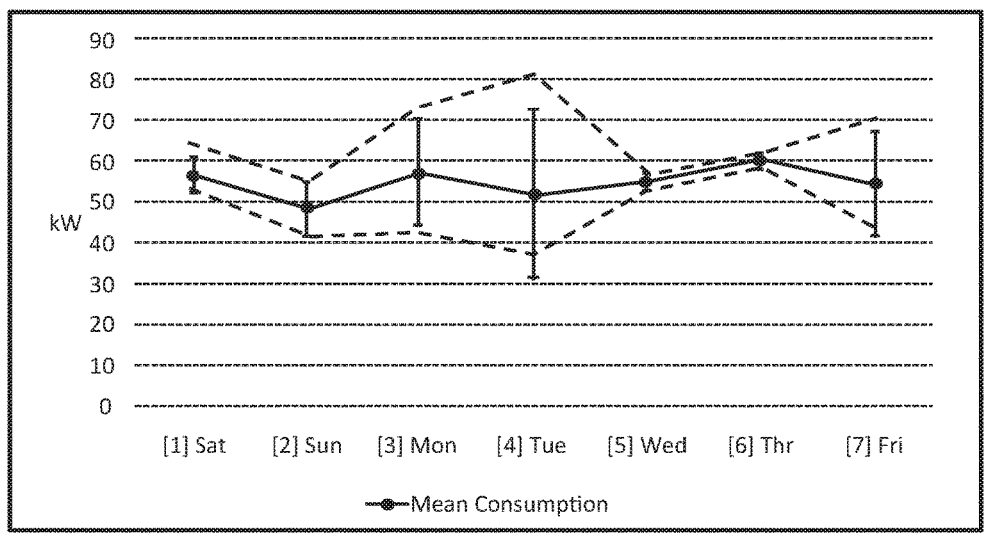
FIG. 10 is a graph showing Mean and Standard Deviation over Period Length of One Week and Time-Resolution of One Day.

Patterns can be found in different frequencies and time-resolutions. For instance, a pattern can be found in hours of every day—time-resolution of an hour, period length of a day (FIG. 9); another example is detecting a pattern in days of a week—time-resolution of a day, period length of a week (FIG. 10).

While multiple patterns can exist simultaneously, the combination of patterns varies for different households. For instance, while one user may demonstrate a very strong hourly behavior every day, another user may not demonstrate a clear hourly pattern at all. Nevertheless, the same two users might have strong weekly-day patterns. Consequently, the present invention provides a method and system which can analyze all possible patterns and extract and only the appropriate ones for each user.

To make the matter more complicated, on a single frequency, a user might demonstrate a behavioral pattern in parts of the period length, and no behavior at all in the remaining. For instance, most users have a very strong behavior over sleeping hours (highly repeating, low deviation), but no clear behavior during the daytime (non-repeating, high deviation). FIG. 9 demonstrates this fact as the deviation in early hours of a day is rather minimal, while the deviation of the later hours of the day varies significantly. Therefore, the forecast algorithm should be able to integrate the detected patterns in the highest time-resolution (smallest values for defined below), and for each time unit in the future use their strongest patterns to make a forecast. To demonstrate this in FIG. 9 and FIG. 10, the forecast value for 5 AM Tuesday should be entirely based on the pattern in FIG. 9; the forecast value for 3 PM Thursday should be mostly based on the pattern in FIG. 10; and the forecast value for 1 AM Wednesday should take advantages of the both patterns.

Pattern Analysis

As noted above, patterns exist in different frequency and time-resolutions. The consumption data, provided in a resolution, is presented by $C^\alpha$:

$$C^\alpha = \{C_1^\alpha, C_2^\alpha, C_3^\alpha, \ldots, C_N^\alpha\}$$

The first step, then, is to take this data to the correct time-resolution for the pattern of interest, $\beta$:

$$\text{new size } \dot{N} = \frac{N}{\beta}$$

$$C^\beta = \{C_1^\beta, C_2^\beta, \ldots, C_{\dot{N}}^\beta\}$$

$$C^\beta = \left\{\sum_{i=1}^{\frac{\beta}{\alpha}} C_i^\alpha, \sum_{i=\frac{\beta}{\alpha}+1}^{2\cdot\frac{\beta}{\alpha}} C_i^\alpha, \ldots, \sum_{i=(\dot{N}-1)\frac{\beta}{\alpha}+1}^{\dot{N}\cdot\frac{\beta}{\alpha}} C_i^\alpha\right\} \to k = [1, \dot{N}] : C_k^\beta = \sum_{i=(k-1)\frac{\beta}{\alpha}+1}^{k\cdot\frac{\beta}{\alpha}} C_i^\alpha$$

Note that $\beta \geq \alpha$, since the desired pattern resolution is never smaller than the original data's resolution. Next, the mean ($\mu$) is calculated and the deviation(s) of each $\beta$-sized time interval (t), within the period length P.

$$\text{for } t = \left[1, \frac{P \cdot \alpha}{\beta}\right] \text{ and } d = \left\lfloor \frac{\dot{N}}{\frac{P \cdot \alpha}{\beta}} \right\rfloor = \left\lfloor \frac{N}{P \cdot \alpha} \right\rfloor,$$

$$\mu_t = \frac{1}{d}\sum_{i=0}^{d-1} C_{(i \cdot d + t)}^\beta,$$

$$s_t = \sqrt{\frac{1}{d-1}\sum_{i=0}^{d-1}\left(C^{\beta}_{(i\cdot d+t)}-\mu_t\right)^2}$$

A more algorithmic way of representing μ and s is:

$$\left\{\forall i:i\%\frac{P\cdot\alpha}{\beta}=t\mid\mu_t=\frac{1}{d}\sum_i C^{\beta}_i\cdot s_t=\sqrt{\frac{1}{d-1}\sum_i\left(C^{\beta}_i-\mu_t\right)^2}\right\}$$

A forecast of the future consumption can be made based on the mean and standard deviation. While a low standard deviation ($s_t$) indicates a highly repetitive behavior in the given time resolution and offset, a high deviation indicates no significance pattern.

Once the standard deviation is acceptable at the given time-interval t of 1/P frequency, the mean value ($\mu_t$) can be used as the prediction of the users future behavior at the same time-interval of future periods.

Pattern Analysis Example

The following section demonstrates an example of the above steps. Using an hourly data provided for a period of a month (N=720 hours), the behavioral pattern over days of a week are investigated (resolution: 1 day or 24 hours, period length P=1 week or 168 hours).

Table 1 shows a portion of the raw data [ref: LM SFD E (ID 2002282), 30 Jun. 2006 to 29 Jul. 2006] $C^{\alpha}$, where α=1 hour.

TABLE 1

| Raw Consumption Data, Resolution: Hours |||||||||||||||
| --- | --- | --- | --- | --- | --- | --- | --- | --- | --- | --- | --- | --- | --- | --- |
| 0.55 | 0.53 | 0.57 | 0.59 | 0.54 | 0.54 | 0.55 | 0.57 | 1.70 | 0.86 | 2.03 | 1.61 | 1.52 | 1.44 | 5.27 |
| 4.82 | 3.41 | 4.46 | 2.23 | 4.67 | 7.07 | 5.38 | 3.75 | 1.56 | 1.39 | 1.05 | 0.65 | 0.77 | 0.55 | 0.58 |
| 0.54 | 2.35 | 3.91 | 1.17 | 2.70 | 1.55 | 1.65 | 1.38 | 4.34 | 3.40 | 1.29 | 1.35 | 1.53 | 3.79 | 7.07 |
| 3.35 | 3.91 | 1.24 | 1.50 | 1.74 | 0.91 | 0.92 | 0.90 | 0.63 | 2.75 | 4.52 | 4.87 | 6.13 | 6.10 | 4.75 |
| | | | | | | ... | | | | | | | | |
| 7.04 | 7.75 | 6.41 | 7.27 | 5.73 | 5.96 | 0.88 | 1.32 | 0.88 | 0.57 | 0.56 | 0.70 | 0.84 | 3.58 | 3.62 |
| 4.83 | 1.48 | 1.28 | 1.06 | 1.22 | 2.14 | 3.08 | 1.16 | 3.60 | 2.74 | 4.07 | 2.45 | 1.82 | 1.82 | 1.33 |

Table 2 shows C for resolution β=24 hours:

$$\dot{N}=\frac{N}{\beta}=30$$

TABLE 2

| Consumption Data at 1-Day Resolution |||||||||||
| --- | --- | --- | --- | --- | --- | --- | --- | --- | --- |
| [1] Fri | [2] Sat | [3] Sun | [4] Mon | [5] Tue | [6] Wed | [7] Thr | [8] Fri | [9] Sat | [10] Mon |
| 56.186 | 51.502 | 72.864 | 81.64 | 56.909 | 59.756 | 57.13 | 62.92 | 55.822 | 42.429 |
| [11] Tue | [12] Wed | [13] Thr | [14] Fri | [15] Sat | [16] Sun | [17] Mon | [18] Tue | [19] Wed | [20] Thr |
| 48.701 | 52.075 | 57.181 | 69.254 | 53.897 | 41.883 | 60.563 | 39.816 | 55.973 | 61.194 |
| [21] Fri | [22] Sat | [23] Sun | [24] Mon | [25] Tue | [26] Wed | [27] Thr | [28] Fri | [29] Sat | [30] Sun |
| 44.292 | 54.078 | 44.725 | 51.656 | 37.444 | 53.175 | 60.031 | 42.494 | 72.379 | 47.006 |

Finally,
Table 3 presents the values for $\mu_t$ and $s_t$:

$$t=\left[1,\frac{P\cdot\alpha}{\beta}\right]=[1,7],$$

$$d=\left\lfloor\frac{N}{P\cdot\alpha}\right\rfloor=4$$

TABLE 3

| Calculated Mean and Standard Deviation |||
| --- | --- | --- |
| τ | μ | s |
| 1 (Fri) | 53.29 | 12.5 |
| 2 (Sat) | 56.77 | 4.23 |
| 3 (Sun) | 48.48 | 6.34 |
| 4 (Mon) | 56.88 | 13.0 |
| 5 (Tue) | 51.90 | 20.4 |
| 6 (Wed) | 54.53 | 2.28 |
| 7 (Thr) | 59.54 | 1.69 |

As shown in previously in FIG. 10, the above load profile demonstrates a strong repeating behavior on Wednesday and Thursdays ($s_{wed}$=2.28, $s_{thr}$=1.69), while the behavior on Tuesdays is the least predictive ($s_{tue}$=2). Therefore, if a prediction is to be made for a coming Wednesday, $\mu_{wed}$=54.53 can be used as a reliable estimate.

Trend Analysis

Figure 11:
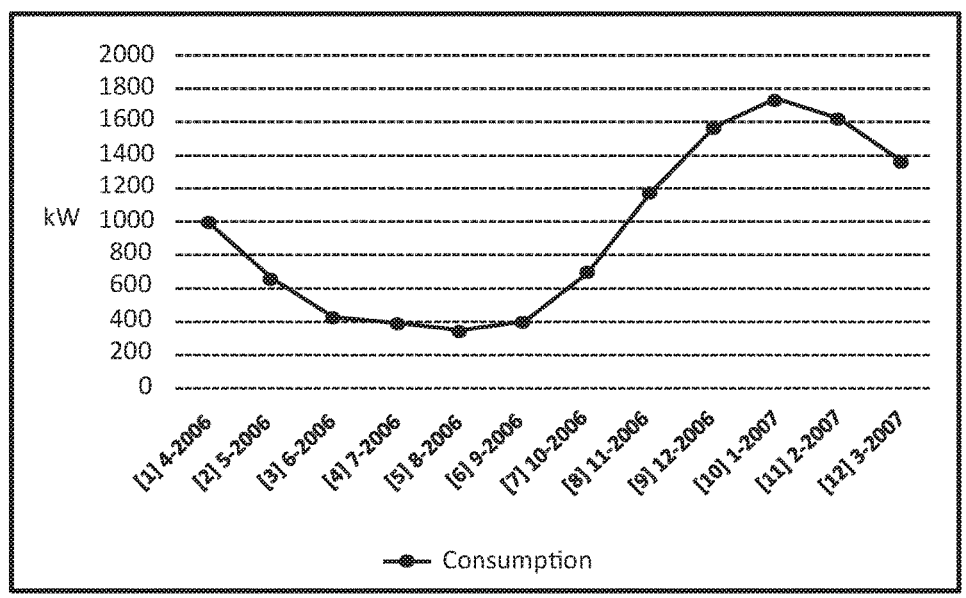
FIG. 11 is a graph showing Monthly Consumption Pattern, Demonstrating Continuous Changes over Time.

Many behavioral changes occur continuously over the course of time. An example of this is shown in FIG. 11. A likely explanation for such smooth transitions is the correlation between consumption behavior and seasonal factors such as weather.

When a user's consumption changes, the average-based 'Pattern Analysis' method would require some time to adjusts its forecasts. This is because the new behavior should represent a significant part of the history-data, before it shows itself in the mean-values. Therefore, the forecast would lag behind such changes.

In order to decrease the response time, consumption trends can be taken into account within the present method and system. While Pattern Analysis examines change in consumption over time, Trend Analysis focuses on the rate of change. As in the above example, the user's consumption increase in December is easily predictable in the previous month. Hence, detecting trends helps the forecast respond to changes quickly, thus increasing the performance index by minimizing error.

Trends can be examined at different time-resolutions and polynomial orders. Lower time-resolution (large β values) make the trend analysis less sensitive to noise—highly deviated data with insignificant forecasting value. Moreover, higher polynomial orders are more responsive to change, but also more sensitive to noise.

After adjusting the consumption data's resolution (same as the initial step in Pattern Analysis), linear regression is used to detect the trend:
n: polynomial order, $$c = a_0 x^n + a_1 x^{n-1} + \ldots + a_{n-1} x + a_n$$

where x is the time and c is the consumption. The least-squared solution to the above polynomial is:
m: data points, $$\begin{bmatrix} C_1 \\ C_2 \\ \vdots \\ C_m \end{bmatrix} = \begin{bmatrix} 1 & x_1 & x_1^2 & \ldots & x_1^n \\ 1 & x_2 & x_2^2 & \ldots & x_2^n \\ \vdots & \vdots & \vdots & \ddots & \vdots \\ 1 & x_m & x_m^2 & \ldots & x_m^n \end{bmatrix} \begin{bmatrix} a_0 \\ a_1 \\ \ldots \\ a_n \end{bmatrix} \rightarrow Y = XA$$

$$X^T C = X^T X A \Rightarrow A = (X^T X)^{-1} X^T C$$

For instance, the solution to a first order polynomial would be:

$$\begin{bmatrix} C_1 \\ C_2 \\ \vdots \\ C_m \end{bmatrix} = \begin{bmatrix} 1 & x_1 \\ 1 & x_2 \\ \vdots & \vdots \\ 1 & x_m \end{bmatrix} \begin{bmatrix} a_0 \\ a_1 \\ \ldots \\ a_n \end{bmatrix}$$

solving for α's:

$$\begin{bmatrix} a_0 \\ a_1 \end{bmatrix} = \left( \begin{bmatrix} 1 & 1 & \ldots & 1 \\ x_1 & x_2 & \ldots & x_m \end{bmatrix} \begin{bmatrix} 1 & x_1 \\ 1 & x_2 \\ \vdots & \vdots \\ 1 & x_m \end{bmatrix} \right)^{-1} \begin{bmatrix} 1 & 1 & \ldots & 1 \\ x_1 & x_2 & \ldots & x_m \end{bmatrix} \begin{bmatrix} c_0 \\ c_1 \end{bmatrix}$$

$$n \sum_{i=1}^{m} x_i$$

Having solved for α's, the polynomial equation can now be used to determine the consumption at a given time (x) in future.

first order: $tr(x) = a_0 x + a_1$ n-th order: $tr(x) = a_0 x^n + a_1 x^{n-1} + \ldots + a_{n-1} x + a_n$ The accuracy of the estimated trend line can be measured by:

$$ESS = \sum_{i=1}^{m} (tr(x_i) - c_i)^2 = C^T C - (X^T X)^{-1} X^T C X^T C$$

Data Expiry

User consumption behavior changes over the course of time and factors such as season can play a significant role in the consumption. As collected load data age, they can potentially become less accurate due to changes in user's life style, season or weather. Therefore, a time will reach when the data 'expire'—e.g. the aged data will not be considered in analysis any more within the method and system of the invention.

There are various advantages and disadvantages to eliminating old data:

a. Advantage: the forecast algorithm responds quickly to changes in behavior.

b. Advantage: less memory is required for storing the aged data.

c. Disadvantage: a temporary change in behavior—a big enough change that is not sustainable enough for forecasting consideration—can significantly affect the forecast (i.e. noise sensitivity).

Each type of pattern or trend calculation can have its own data expiry policy, since different analysis might require various sizes of historic data in order to work well.

Forecast Responsiveness

PowerTab™'s forecast algorithm enables forecast responsiveness to changes in consumption behavior. The method and system of the present invention provide a balance between a non-responsive system and a highly responsive one. For instance, it is not desirable that the forecasted bill increases vividly when a user's consumption doubles for an entire week, nor is it desired that the forecast change notably when a user has done two hours of laundry.

In long term, non-responsive systems produce more accurate forecasts, while the highly responsive ones occasionally react to noisy data and produce inaccurate predictions that lowers their overall performance. This is similar to any Control System in which fast response time causes overshoot.

A primary objective of the Smart Budgeting method and system is forecasting the electricity bill based on users current behavior to inform them of how much they will be charged if they continue to consume "this way". Therefore, rather than trying to forecast with least possible error, the forecast value/end product of one aspect of the present invention, ties itself greatly with user's current consumption behavior. For example, if a user over-consumes for a few days in a row, our system should increases its bill estimation to warn the user about their behavior. If the users over-consumption days are temporary, the increased estimation introduces error and a non-sensitive forecast system can eliminate that error; however, based on the intended application of the forecast system, a consistent over-consumption behavior is worthy of warning and hence the error factor is not as important as this objective.

Two factors play a role in the forecast responsiveness: trends, and data expiry periods. Trends play the most significant role in responsiveness since they attempt to forecast based on the recent user behaviors (for example, the last data points in the trend calculation considerably affect the trend forecast). This makes the trend analysis very sensitive to noise—highly deviated data with insignificant forecasting value. One way to lessen this over-responsiveness is to use trends on low-resolution data (large β value such as days or weeks) and hence reducing the noise sensitivity.

Additionally, the length of the data history used for pattern and trend calculations is another important factor in sensitivity of the forecast system. This concept was introduced in the Trend Analysis discussion above. While the 'noise sensitivity' created by Data Expiry can be disadvantageous to a generic forecast algorithm, it will in fact be advantageous to the intent of the Smart Budgeting method and system. The present invention does indeed require responsiveness to user's behavior in order to inform them of the consequences of their current consumption habit. And therefore, the only forecasting drawback of the Data Expiry is in fact useful for PowerTab™. The expiry period has to be chosen delicately in order to maintain reasonable responsiveness.

Integration

Various patterns and trends can exist for any given user at any given time. An important step toward a reliable forecast is integrating all patterns and trends to obtain a concise outcome. The integration needs to be proportional—a more accurate pattern/trend should affect the outcome more significantly than a less accurate one. The accuracy of a pattern is inversely proportional to $s_t$ (standard deviation) at given time, and the accuracy of a trend is inversely proportional to ESS.

The Smart Budgeting method and system starts with integrating all patterns first, before applying the trends:
for k patterns and trends,
$^u\mu_x$, $^us_x$: mean and standard deviation at time x for pattern u
$^u tr(x)$, $^v ESS$: trend estimate and error at time x for trend v $$\begin{cases} u: \text{pattern,} & ^u p_x = {}^u(\mu_x) \\ u: \text{trend} & ^u p_x = {}^u tr(x) \end{cases}$$

$$w(x) = \sum_{v=1}^{k} \frac{1}{{}^v s_x}, \quad P(x) = \sum_{u=1}^{k} \frac{{}^u p_x \cdot \frac{1}{{}^u s_x}}{w(x)}$$

where w(x) represents the total weight of all pattern forecasts at time x, and f(x) represents the final forecast value. The above method applies to patterns/trends of the same time-resolution. Those of varying resolution can be combined when they are converted to the lowest time-resolution:

$$p^\alpha = \{p_1^\alpha, p_2^\alpha, \ldots, p_N^\alpha\},$$

α: resolution, β: new resolution, β > α

$$\left\{ \forall i: (t-1) \cdot \frac{\beta}{\alpha} < x_i \leq t \cdot \frac{\beta}{\alpha} \middle| {}^u p_t^\beta = \sum_i {}^u p_i^\alpha \right\}$$

$$P(x) = {}^{hi}p_x^\beta \cdot \frac{{}^{lo}p_x^\alpha}{{}^{lo}p_{t:(x \in t)}^\beta}$$

$$\tilde{S}_x^\alpha = {}^{to}s_x^\alpha \cdot \frac{{}^{lo}p_x^\alpha}{{}^{lo}p_{t:(x \in t)}^\beta}$$

The following steps should be taken to integrate all patterns:

Integrate all patterns of the highest resolution. Since trends are only used at lower resolution, no trend would be integrated at this step.

Integrate all patterns/trends of the next highest resolution. Use the technique for varying resolutions to integrate the last two outcomes.

Repeat steps b and c until no lower resolution pattern exists.

Since user behaviors vary diversely, not every pattern or trend analysis can highlight a useful repeating behavior. However, using the above integration approach, many patterns and trends proportional to their forecasting strength can be integrated, and in a dynamic, time-efficient manner.

If after further examination of user behaviors it is discovered that a substantially small group of users has a very distinct yet strong behavioral pattern, an appropriate pattern analysis component can be added to the method and system for those users. This addition would strongly improve forecasting performance for those niche users, while not at all degrading the performance for all other users who do not behave that way. This feature of the present "integration approach" makes the method and system very sustainable for future research and customization to new markets.

Examination

Using the load profile data of 17 households over a course of a year, the above principles were adopted to PowerTab™'s specifications. Two patterns (daily-hours and weekly-days) and one trend (first-order weekly-based) were found sufficient for an accurate forecasting capability.

Pattern: Daily-Hours

The highest possible time-resolution of a forecast is equal to the highest time-resolution of the analyzed patterns. Therefore, to be able to make hourly forecasts, patterns of hourly behavior were preferably analyzed. Clearly, the most useful hourly-based pattern can be calculated for a period-length of one day—hence the name Daily-Hours. Daily-Hours analysis has proved itself very helpful for forecasting, because time of day is one of the most significant parameters for user's behavior.

Figure 12:
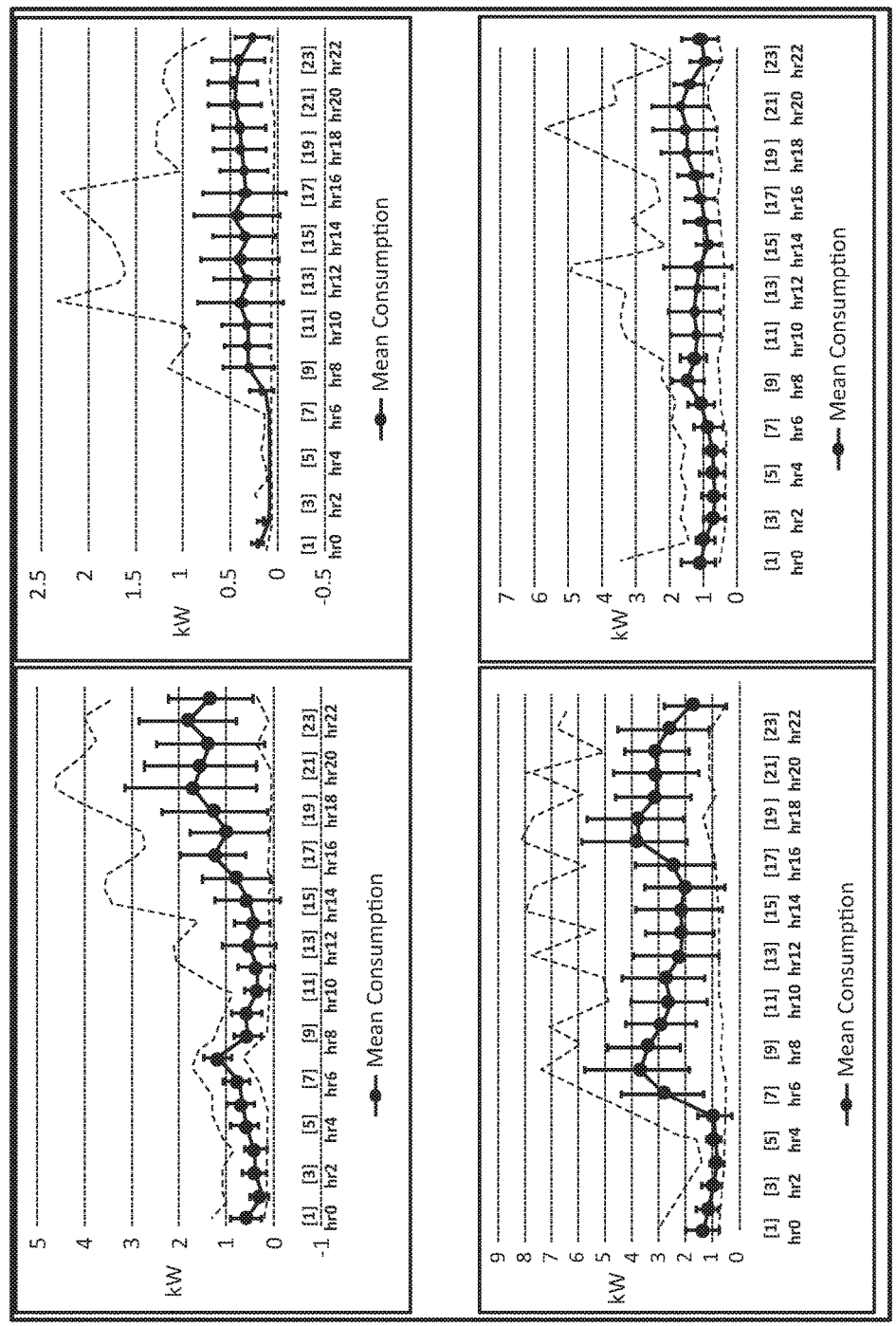
FIG. 12 is a series of graphs showing Daily-Hour Patterns.

FIG. 12 demonstrates the daily-hour behavior of various users:

A considerable majority of users have a very low-deviating behavior over sleeping hours. Yet, the behavior during the daytime varies. FIG. 1a demonstrates this fact as the deviation in early hours of a day is rather minimal, while the deviation of the later hours of the day varies significantly.

The data-expiry limit for daily-hour analysis is set to 30 days (i.e. data older than 30 days are not used for this analysis). The 30 days limit is set in order to keep the algorithm responsive to changes in daily behavior, while making sure it is not too sensitive to noise and outliers.

Pattern: Weekly-Days

Figure 13:
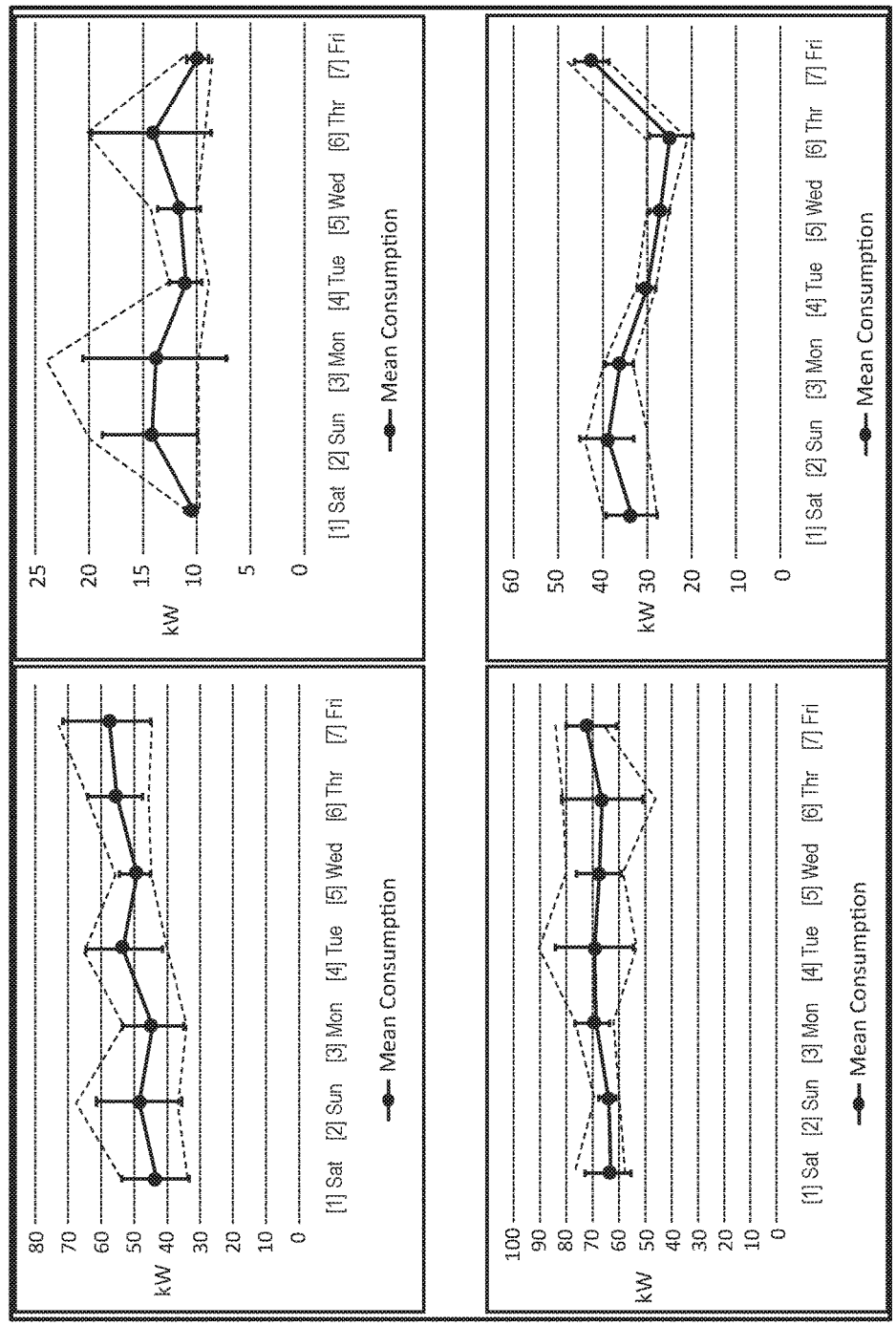
FIG. 13 is a series of graphs showing Weekly-Day Patterns.

Useful behaviors can be found by analyzing user's daily consumption during each week—hence the name Weekly-Days. Factors such as weekdays and weekends can influence user's consumption behavior; additionally, weekly working schedules of repeating nature are very common. Therefore, as expected, pattern analysis at time-resolution of one day and period-length of one week has improved the performance as seen in FIG. 13.

The data-expiry limit for weekly-day analysis is set to 60 days (i.e. data older than 60 days are not used for this analysis). This limit provides an average of 8 samples for each day of the week, which is rather minimal for an accurate averaging. Meanwhile, extending the data-expiry beyond 60 days is dangerous because after two month, those data can be obsolete for forecasting purposes (i.e. high possibility that user's consumption behavior has changed significantly).

Trend: First-Order Weekly-Based

Based on data acquired, a trend line on a weekly time-resolution and using a first-order polynomial fitting has proved itself very useful for accurate forecasting. Any time-resolution higher than one week is prone to frequent error due to noise and outliers. Moreover, 1st order, 2nd order and 3rd order polynomials were experimented with. While 2nd and 3rd order perform better estimates at various occasions, the overall performance of the 1st order regression was better.

The data-expiry limit for the weekly trend analysis is set to 60 days (i.e. data older than 60 days are not used for this analysis). This limit provides 8 data points (weeks) for trend-line calculation. This is rather minimal for an accurate trend estimation. Meanwhile, extending the data-expiry beyond 60 days is dangerous because after two month, those data can be obsolete for forecasting purposes (i.e. high possibility that user's consumption behavior has changed significantly).

Importantly, it was discovered that the weekly-based trend analysis creates a suitable responsiveness for the forecast algorithm. As soon as a user spends a good portion of a week (3 days or more) over-consuming, the weekly consumption for the most recent week increases, causing the trend-line to shift upward. This effect increases the forecast estimate of the upcoming days. The increase helps warn users about the value of their next bill, if they continue their recent consistent over-consumption behavior.

Absence Detection

Two types of patterns exist: repeating, and non-repeating. Repeating patterns are useful to forecasting (e.g. sleeping hours), while non-repeating patterns—statistical outliers—are misleading. Outliers are infrequent in nature, and since our approach is based on averaging, they are insignificant to the outcome.

Behavioral outliers exist as well—non-repeating behavioral patterns that deviate from standard. However, as opposed to statistical outliers, behavioral outliers are not always infrequent. Vacation periods are a perfect example of non-infrequent behavioral outliers. Due to their length in time, these behavioral outliers can affect the forecast outcome significantly. For instance, a three-week vacation period can completely mislead the forecast algorithm's expectation of the user's behavior.

In this case, an absence detection mechanism is implemented with the Smart Budgeting method and system of the present invention which excludes from the forecast algorithm, the periods in which no user is at home. One can easily spot absence periods when looking at the consumption graphs. That is due to human brain's highly capable pattern recognition skills. Absence periods share two characteristics: first, the usage is observably lower than typical consumption periods; this property, however, does not help detecting absence times since both the magnitude of consumption, and the ratio of absence consumption to typical consumption, are rather hard to define as they vary from one user to another.

The second characteristic of an absence period is its low deviation in the consumption record; since no person is present at home, the changes occurred in the consumption are significantly smaller than that of a typical period. Some time-varying electric appliances such as thermostat heater or air conditioner, however, can introduce deviations to the power consumption during absence periods. Two solutions may be introduced to the Smart Budgeting method and system, and when combined, they can solve this problem:

Defining consumption deviation tolerance ranges based on a percentage of the typical consumption deviation. If deviation is higher, someone is present; if it is lower, no one is.

Use of the previous day's absence status: If a user was absent yesterday, s/he might be on vacation and hence s/he is more likely to be absent today.

Utilizing fuzzy logic, this two decision methods can be combined based on the following table:

TABLE 4

Fuzzy Logic Table for Absence Detection

|  |  | YESTERDAY | | | |
| --- | --- | --- | --- | --- | --- |
|  |  | Yes | Likely | Unlikely | No |
| TODAY | Yes | True | True | True | False |
|  | Likely | True | True | False | False |
|  | Unlikely | True | False | False | False |
|  | No | True | False | False | False |

Figure 14:
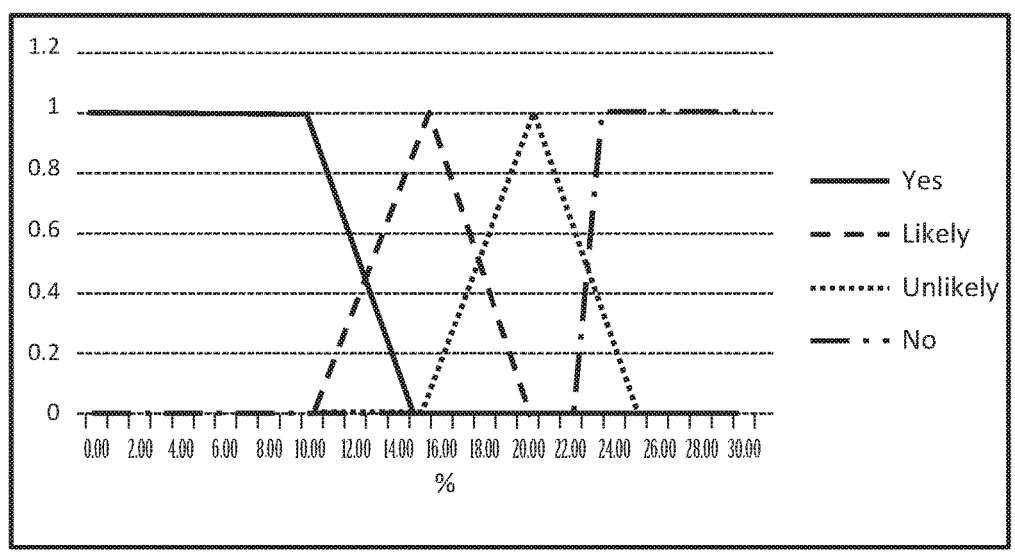
FIG. 14 is a graph showing the absence of detection Fuzzy Sets.

The four fuzzy sets of "Yes," "Likely," "Unlikely" and "No" are defined as in FIG. 14.

Finally, to calculate the values for "today" and "tomorrow" variables, we use the following set of equations:

$$\mu = \frac{1}{24} \sum_{i \in P} C_i,$$

$$s = \sqrt{\frac{1}{23} \sum_{i \in P} (C_i - \mu_{day})^2}$$

$s_{today} = s(P=\text{today's consumption data})$ $s_{yesterday} = s(P=\text{yesterday's consumption data})$ $s_{all} = s(P=\text{entire consumption data})$ $$\text{today} = \frac{s_{today}}{s_{all}},$$

$$\text{yesterday} = \frac{s_{yesterday}}{s_{all}}$$

To elaborate on the above equations, the ratio of the today and yesterday's hourly standard deviation, over the overall hourly standard deviation. If the ratio value is reasonably small in both days, that shows a lower than usual daily consumption deviation, which helps detect absence of users.

Light Indicator

Among the most important features of the PowerTab™ is its light indicator that provides instantaneous feedback to user's consumption behavior to help them lower their consumption within their targeted budget. The light indicator has two states: Red representing overconsumption, and Green representing proper consumption. When the light is red, the user is expected to take measures to lower their consumption; and when the light is green, the user is notified that their current behavior would achieve the target.

Budgeting

The light indicator uses the user-inputted target bill value, the dollar consumption so far, and the user's forecasted behavior in order to determine an hourly budget for the remaining part of the billing cycle. The operation is performed as follows:

given: $t \in Q$, $Q$: remaining period in the current billing cycle

T: target budget ($), S: spent so-far ($), $g_t$ cost of 1 kwh at time t $f_t$: forecasted consumption (kwh) at time t, $s_t$: forecasts deviation at time $t$ First, within one embodiment of the Smart Budgeting method and system, the remaining dollars to be spend during the remaining days of the current billing cycle is calculated:

$R$: remaining budget (\$), $R=T-S$

Next, a budget for every remaining hour of the billing cycle, based on both the forecasted spending and its possible deviation, is specified:

Case 1) If the unconsumed budget is more than forecasted spending: the extra money will be divided between all remaining hours, proportional to the forecast deviation. For instance, since the deviation is small during sleeping hours, not much of the extra money will be devoted to those hours since the user clearly does not need much room there. However, during hours where the user does not spend consistently, he/she will be given additional budget.

Case 2) If there is some money left in the budget (unconsumed budget>0), yet the left-over is less than the forecasted consumption: this means that the user is over-consuming, so his/her hourly forecasted consumption should be reduced. When giving extra money to each hour, this was allocated proportionally to each hour's consumption deviation. However, when shrinking the consumption, the method and system of the present invention does it proportional to the forecasted consumption itself. That is because one end goal of Smart Budgeting is to encourage the user to adopt a more conservative behavior by saving at all times. Even during sleeping hours when the deviation is low, turning off an extra appliance might be the key in achieving the target bill, and therefore he/she is asked to lower every hour of consumption by a certain percentage rather than considering the deviation patterns.

Case 3) Finally, if the amount of money spent so far is more than the total budget (remaining budget<0), then the user cannot achieve his/her goal and a \$0 budget for every remaining hour is specified.

The above policies are implemented within the Smart Budgeting method and system and represented in the following equations:
$F$: forecasted spending (\$), $$F = \sum_{t \in Q} f_t \cdot g_t,$$

$$R > 0 \cdot R \geq F: B_t = f_t \cdot g_t + \rho \cdot \frac{S_t}{\sum_{u \in Q} S_u}, \text{ where } \rho = R - F$$

$$R > 0 \cdot R < F: B_t = f_t \cdot g_t \times \frac{R}{F}$$

State Determination

Once the consumption budget of the remaining billing period is determined, the light indicator should decide whether the user is over-consuming (red or green light). The most important criterion for state determination is whether the consumption of this hour is less than or equal to this hour's budget:

$$\text{rule \#1: } \begin{cases} \text{under-consumption} & C_{now} \cdot g_{now} \leq B_{now} \\ \text{over-consumption} & C_{now} \cdot g_{now} > B_{now} \end{cases}$$

Considering the following scenario: a user's budget is \$70. It is the 6th week of the 8-week long billing period, and she has spent \$30 so far. Therefore, the user has 2 weeks left and \$40 to spare, which means her consumption can triple and still the target budget will be met. If the user decides to do 3 hours of doing laundry, cooking dinner, ironing and watching TV all at the same time, she will surpass her hourly budget. Should she be warned about this?

A reasonable answer to this question is 'no', because the user has a considerable amount of budget left and it is very clear that a mere 3 hour of overconsumption would not challenge the achievability of her target bill, due to her fine record of under-consumption. However, if the above rule were to be considered independently, the light indicator would go red which would come as a surprise to the user. Such unreasonable judgment by PowerTab™ can seriously challenge its trustworthiness for helping users conserve, which is its primarily objective.

To rectify the above problem, a new criterion is introduced within the method and system of the invention which adds a 'consistency' factor to the decision of whether a user is over-consuming. In other words, not only the user should be consuming more than the current hour's budget, she should be consistence in it for a short period to receive a warning. To do so the light indicator looks into user's last 24 hours of consumption, and if there is a left-over budget within this time, it uses that to tolerate the current over-consumption:

$$\text{rule \#2: } \begin{cases} \text{under-consumption} & \sum_{t \in \text{last 24 hours}} C_t \cdot g_t \leq \sum_{t \in \text{last 24 hours}} B_t \\ \text{over-consumption} & \sum_{t \in \text{last 24 hours}} C_t \cdot g_t > \sum_{t \in \text{last 24 hours}} B_t \end{cases}$$

The light indicator state will be determined based on the rule #1 and rule #2, as follows:

$$\text{state: } \begin{cases} \text{red:} & (\text{role \#1} = OC) \cdot (\text{role \#2} = OC) \\ \text{green:} & \text{otherwise} \end{cases}$$

Based on the above system, few hours of over-consumption can be tolerated if the user's overall behavior is conservative enough. The following scenarios elaborate the capabilities of the Smart Budgeting method and system:

Case A: A user's budget for the last 24-hour period was \$2.4 and his current hour's budget is \$0.12. He has consumed \$2.1 during this day. If he consumes more than \$0.12 this hour, rule #1 would indicate overconsumption; however, rule #2 would not, and therefore the light will be green. However, this tolerance will be exhausted as soon as the user consumes anything more than \$0.3 within this hour (excessive overconsumption).

Case B: If the above user has spent \$3 within the last day, rule #2 would indicate overconsumption, even if the user is spending less than his \$0.12 budget for current hour. However, the light would still show green, because the extra consumption has already been deducted from user's future budgets (hence shrinking the \$0.12 slightly). Thus, if the user is currently spending \$0.06, he would correctly see a green light indicating that if he continues to do what he is doing 'right now', he would be achieving his consumption goal. But as soon as he passes the hourly budget, he would see a red-light since there is no tolerance to further over-consumption.

Case C: If a user has a \$100 budget, and he has only spent \$30 seven weeks into the period, he would have a \$10 per day budget for the remaining days. If he spends $3 in 23 hours, he would still have $7 to spare in one hour which means he would not get an overconsumption alarm that easily (i.e. very high tolerance).

Dependency on Forecast Algorithm

As demonstrated herein, the forecast value for each hour is the base for its budget determination. An alternative is to use no forecasting and evenly divide the remaining dollars of the budget over every hour. A user's hourly behavior is not even; in some hours the consumption is low (e.g. when sleeping) and in some hours the consumption is high (e.g. evenings). However, if every hour is budgeted evenly, the system would always indicate a green light during sleeping hours, even if the user has forgotten to turn off the TV; and it would always show red light during evenings, even if the user has consumed less than usual.

The other side of the extreme is if it is known 'exactly' how the user is going to behave. In that case, the user would never see a red light if his future behavior would be meeting the budget requirement, even when he is consuming excessively for a few hours—since his behavior and excessive consumption is known and expected, it is known that it would not cause him to go over the budget. However, if the user's behavior leads to surpassing the budget, the system would shrink every future hour's consumption by a needed percentage to meet the budget. It would then use the light indicator to encourage the user to follow within those defined limits. If it is the beginning of the billing cycle, the user would see green light every now and then. However, if the end of the cycle is approaching and the user is still over-consuming, the saving percentage grows higher and higher and it would become almost impossible for the user to lower his consumption to that extend. Therefore, no green lights will be shown anymore indicating that it is not very likely for the user to meet his intended budget.

This is the ideal case, because the light indicator's purpose to answer the following question is met perfectly: is the user going to go over his budget? The more accurately the user's behavior can be forecasted using the Smart Budgeting method and system, the less 'false positives' and 'false negatives' would show.

Using the same principles used in forecasting, absence detection and light indication, the following features can be implemented as additional embodiments of the Smart Budgeting method and system:

Sleep-Prep: The PowerTab™ can determine the usual sleeping hours and patterns of a user. Hence, during the hours in which the user usually goes to bed, an icon can appear on the screen showing whether the household is 'sleep ready'. The PowerTab™ determines the sleep-readiness by analyzing a user's usual sleeping pattern and his budget for those hours. If the current consumption is similar to that of the user's usual sleeping hours and he is within the budget, the PowerTab™ provides a positive feedback. However, if an extra light is left on, a warning can be displayed to notify the user.

Leave-Prep: The same idea as the 'sleep-prep' can be applied for when the user is leaving home especially for longer periods (e.g. vacations). In this case, the user might need to press a button on the PowerTab™ to ask for verification that the house is 'at rest' (minimum power consumption). The PowerTab™ then analyzes previous absence patterns to determine whether an unnecessary appliance is left on or if house is "leave ready".

Today's Performance: A simple addition to PowerTab™ can provide a feedback about user's every day performance rather than that of the entire billing cycle. The system can interpolate today's consumption over the remaining days of the billing cycle and generate a forecast based on today's performance. This forecast would vary greatly from one day to another and is not to be trusted as the final bill's value. However, it can help user understand how he has performed today. Also, this would make the device interactive as the users will have a daily-based challenge; they can set new 'records' by trying to lower than number, and they would not need to wait longer before seeing the effect of their effort. Users may also use social media to share such data and "compete" with neighbors based on performance indicators and other power usage metrics.

Absence Battery Saving: When the forecast algorithm detects that the user is absent, it can turn PowerTab™ off in order to save battery. As soon as someone comes back, the system can detect that by observing the sudden jump in the consumption (turning on lights, etc.) and the device can turn itself on again.

Sleeping-Hours Battery Saving: The same absence battery saving idea applies to the sleeping hours. Again the device can forecast sleeping hours, detect it when a user goes to bed, and turn itself off until changes in the consumption indicate the user's awakeness. The PowerTab™ can automatically turn its display on during morning hours when the user wakes up because it is likely for the user to pass by.

Interfacing with Appliances: Provision and conveyance of information about user's daily behavior to other appliances. Using the PowerTab™, all appliances can be triggered when user sleeps, wakes up, leaves home, goes on vacation, etc. . . . and all this information is detected by the PowerTab™ without any user interaction The foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via ASICs. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

While the forms of method and system described herein constitute preferred embodiments of this invention, it is to be understood that the invention is not limited to these precise forms. As will be apparent to those skilled in the art, the various embodiments described above can be combined to provide further embodiments. Aspects of the present systems, methods and data collection means (including specific components thereof) can be modified, if necessary, to best employ the systems, methods, nodes and components and concepts of the invention. These aspects are considered fully within the scope of the invention as claimed. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

Example User of Power Disaggregation Mobile Application

This example references FIG. 15A-E. User Installs mobile application (PowerTab™) on SmartPhone and is invited via graphical user interface (GUI) indicated generally at 99 (FIG. 15A) on welcome screen 100 to create a profile at 102. User inputs username 103, password 104, some information about himself and his house and billing period etc. . . . 106

Figure 15A:
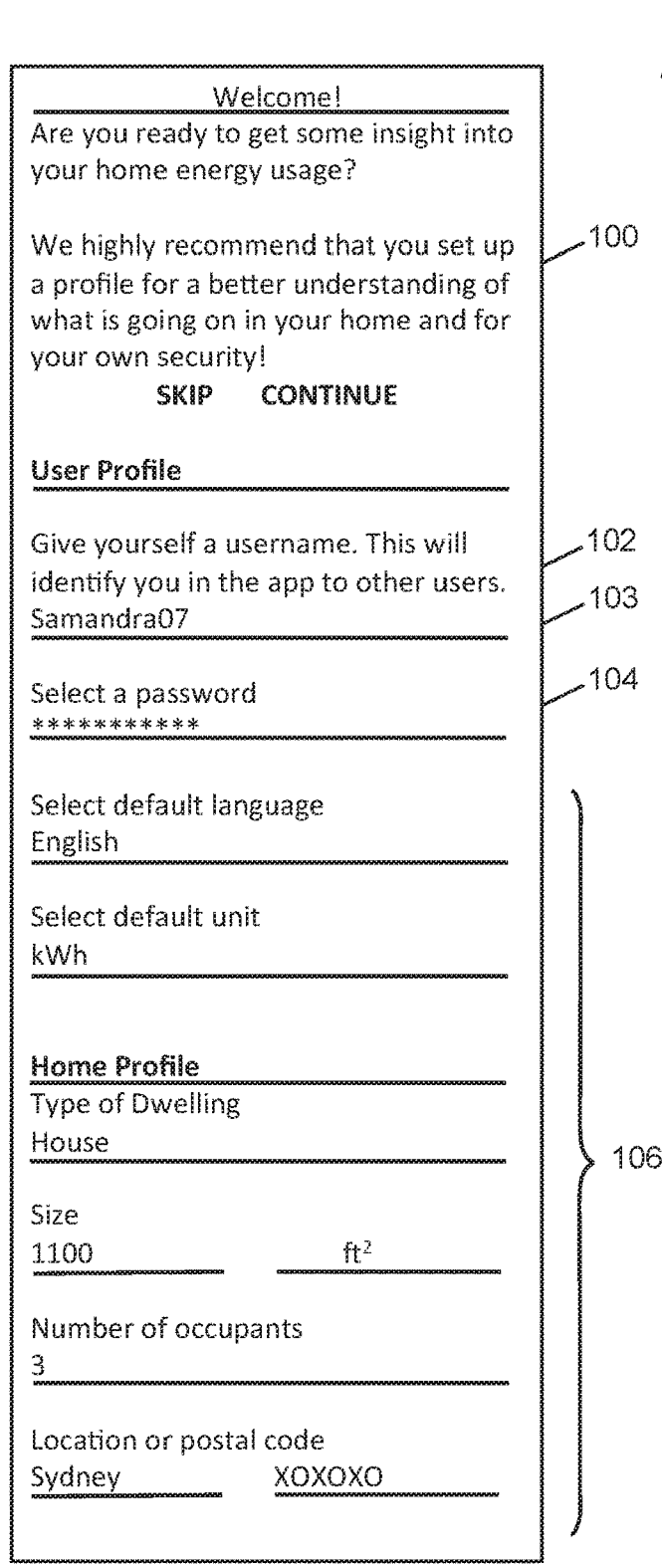
FIGS. 15A, 15B, 15C, 15D and 15E illustrate a series of graphical user interface screens in typical interaction sequences between the system of the invention, on a mobile device, and a user of such a mobile device.
Figure 15B:
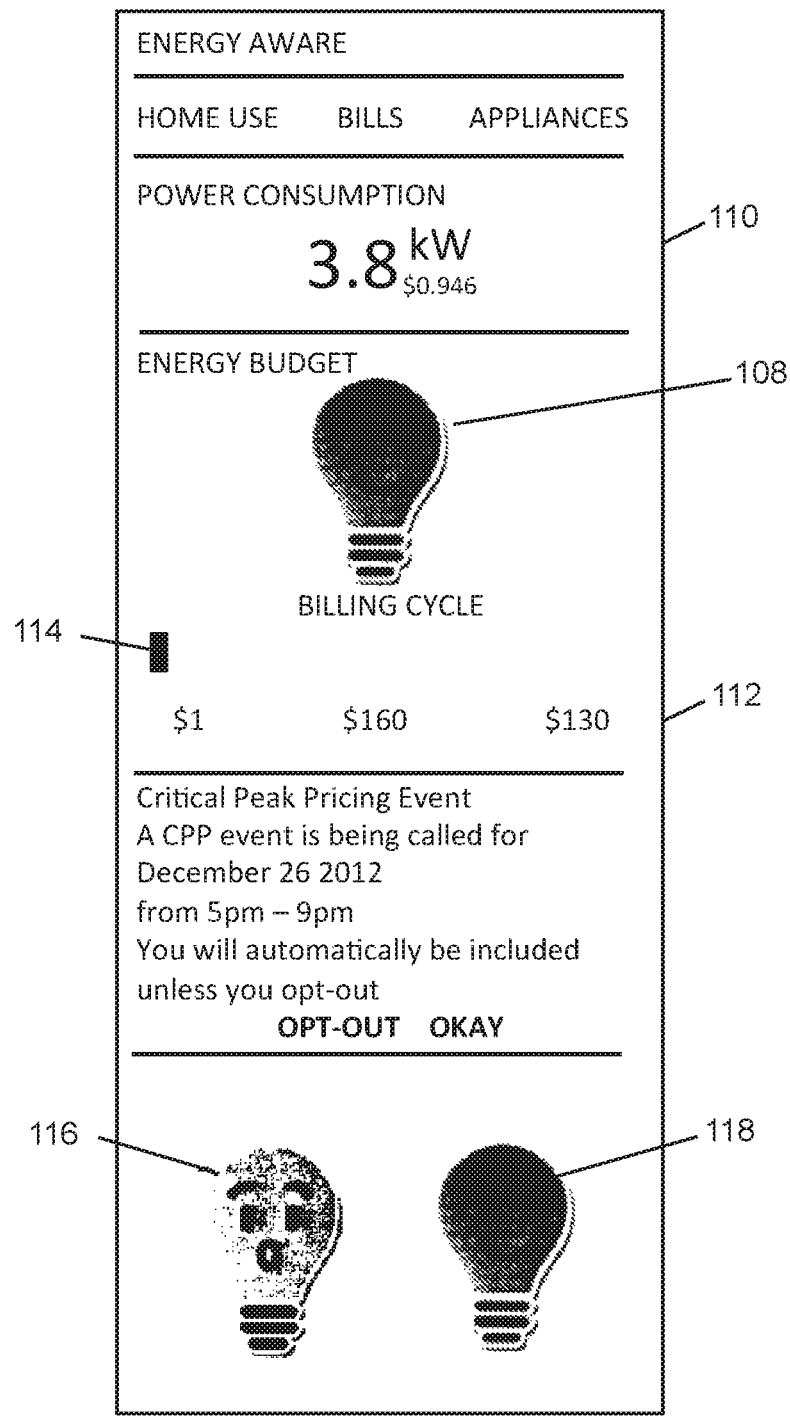
Figure 15C:
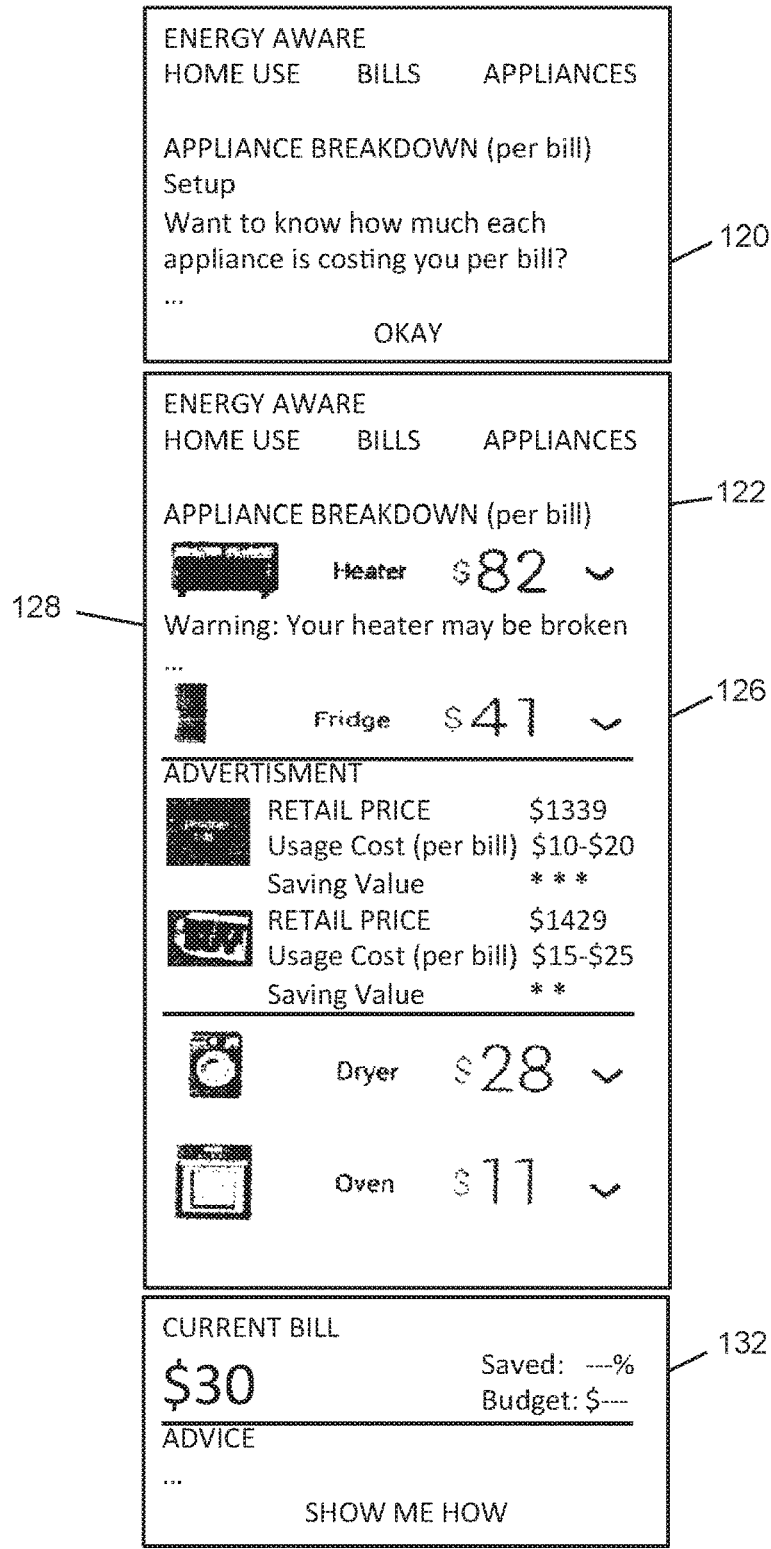

User is then presented with a friendly animated light-bulb 108 (FIG. 15B). Above it, he sees his current household consumption in real-time, updated once every two seconds at interface segment 110. Below the bulb, he notices he can set a goal for his electricity budget over the current billing period at interface segment 112.

The progress bar 114 underneath the bulb also indicates how far he is into his billing cycle, and under the bar he can see how much he has spent on electricity so far in this cycle, and what the app estimates his final bill to cost.

The light bulb itself presents itself with different emotions: happy if the bill estimate is within the specified budget 116, concerned if the bill may to exceed the budget, and upset if the budget cannot be met 118. The real-time consumption bar on the top of the interface page also presents three colors associated with the active Time-of-Use rate. With a single glance, user knows whether he is at the lowest rate (green), at the medium rate (yellow) or at the peak rate (red).

Like many users, this user is curious to see what the app shows when he turns a light on and off. This could also help him understand the impact of that light on his current consumption rate.

The app, detecting user's curiosity, prompts him at 120 (FIG. 15C) to try out other appliances as well, and provides him at 122 with a list of major appliances with highest impact on a bill: heaters, dryer, washing machine, oven, fridge, etc.

As user is guided through the process of profiling his major appliances, the app is recording the consumptions and by the end of the process, user is presented at 122 with a list of his major energy consumers.

User can see at interface segment 126 how much each appliance contributes to the overall cost of a bill, in kWh, $ as well as a break-down percentage. If a particular appliance is over consuming, this may indicate excessive use, poor appliance energy efficiency, or the possibility of a broken appliance. User is presented at 128 with a warning immediately that his heater may be broken. He proceeds to replace the heater later and observes a $30 monthly saving on his bill.

The app also presents user at segment 130 with a list of alternative energy-efficient appliances offered by third-party retailers, and rates the Saving Value of each app based on their Return-on-Investment.

Figure 15D:
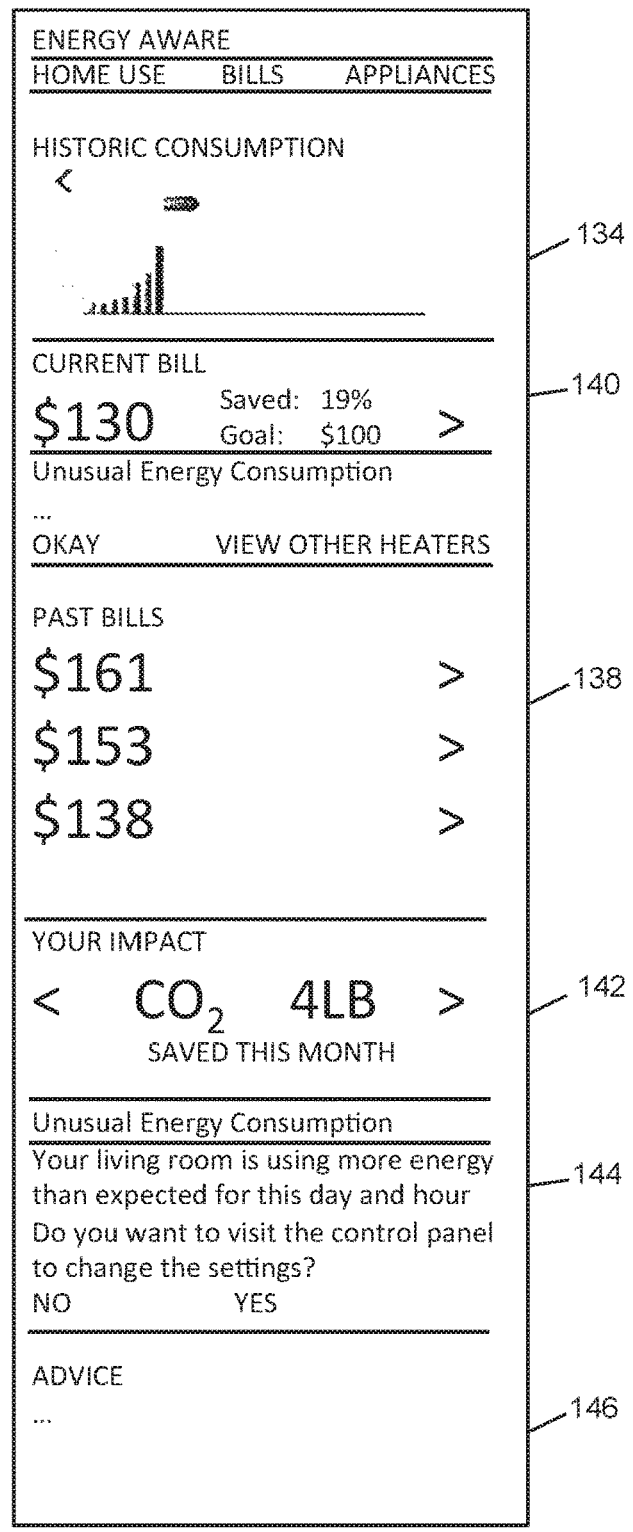
Figure 15E:
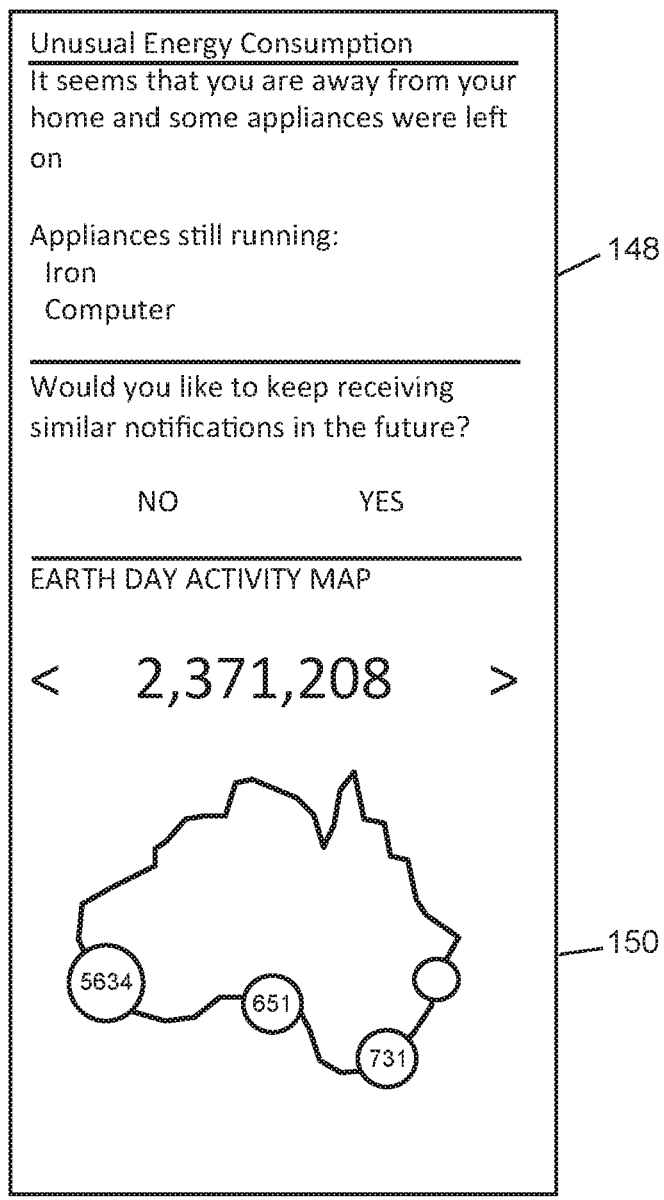

User browses to the Bills page, represented at FIG. 15D. User is asked at 132 to enter the value of his most recent bills, in order to create comparative bases for the app to estimate his savings from now on. The Bills interface page also presents a historic graph at 134 of house consumption, so user can observe his usage over weekdays versus weekends, summer months versus winter months, etc. The graphs can be displayed on daily, weekly, or monthly bases for the period of time in which a smart meter or an energy sensor has been installed in the house.

User can also glance at interface segment 136, at his previous bills 138 and the current bill estimate 140, and see how much savings (the impact) he has accumulated since the start of the app, as well as for every individual bill at 142.

He also sees the amount of greenhouse gases the savings translates to, as well as other interesting facts and matrices regarding his energy consumption performance.

That night as user goes to bed, his PowerTab™ app informs him, via interface segment 144 that his TV may still be on. If true, user may elect to turn off that device. The app also notifies him in suggestion box 146 that if he turns off his bedroom heater and starts using a blanket heater instead, he could use up to $30 per month. The next morning, just as user leave home for work, the app informs them, via interface segment 148 (FIG. 15E) that his iron has been left on. This warning, simple, automatic and directly to user's Smartphone not only helps him cut down on unwanted energy usage, it also notifies him of a potential hazard.

On specific occasions, as programmed by the user or as defined within the PowerTab™ app itself, user may be advised by interface message, text or email of such an occasion. One example of an occasion is Earth Day. When user opens the app, he is prompted to participate in saving energy by turning off his lights between 7 pm and 8 pm. If he agrees to participate, he joins many other participants across the world.

As the event unfolds, user watches an interactive map 150 in the app that shows the participants, how much they have all saved so far, and how much his country, his city and his neighbors are contributing to this movement.

The present invention provides: A system for acquiring and storing disaggregated power consumption data in a premise which comprises:

a) at least one sensor configured to measure at least one desired energy consumption variable associated with a plurality of energy consumption devices within the premises and to generate at least one aggregated output signal therefrom;

b) a data processor configured to receive said aggregated signal from the sensor; said processor comprising a means to create and update a power profile for each individual device, said data processor comprising a memory which comprises a catalogue of each of said individual devices and a respective power draw of each device.

Preferably, the catalogue comprises a data set acquired by a set-up protocol wherein a device is independently switched between on-off, at least one time to isolate a power draw for said device from the aggregated signal. Preferably, the sensor is selected from a current sensor, a voltage sensor, a temperature sensor, an activity sensor, and an acoustic sensor. Preferably, the system additionally comprises a communication interface configured for receiving user commands and queries, for requesting user input in respect to said devices and for transmitting information relating to the devices to the user. Preferably, the communication interface is selected from wired and wireless communication technologies. Preferably, the communication interface is selected from RS232, USB, Firewire™, Ethernet, Zigbee™, Wifi, Bluetooth™, RFJID, wireless USB, cellular, and WMAN communication technologies. Preferably, the processor is configured within a mobile computing device. Preferably, the processor is configured within a mobile computing device selected from the group consisting of a Smartphone, tablet, netbook and laptop, an In-Home Display (IHD) platform and a home-energy management device. Preferably, the sensor is a smart meter. Preferably, the sensor is a smart meter and only one is present in the premises.

A computer implemented method of acquiring, cataloguing and storing power consumption data in respect to a first energy consumption device (with an energy draw) within a premises comprises a plurality of energy consumption devices which comprises:

a) providing a sensor configured to measure at least one desired energy consumption variable associated with the plurality of energy consumption devices (including the first device) within the premises and to generate at least one aggregated output signal therefrom;

b) configuring a data processor to receive said aggregated signal from the sensor;

c) creating a power profile for the first device by instructing a user, via a user interface, to independently switch said device between on-off positions ("switching set up"), at least one time, to isolate a power draw for said device from the aggregated signal, wherein data processor recognizes that the first device was selected and isolates a differential in the aggregate signal based on differing switch positions during the switching set up, said differential being the energy draw of the first device; and d) providing a memory which recallably stores the energy draw of the first device in a catalogue.

Preferably step c) comprises a set-up protocol which is repeated for a plurality of energy consumption devices in the premises to create a catalogue of energy draws for each device and to create an aggregate profile for the premises. Preferably, the set-up protocol need only be done once for each device, with thereafter the catalogue comprising the respective energy draws for each device. Preferably, there are a plurality of devices in the premise and only a selection of devices are profiled. Preferably, the sensor is selected from a current sensor, a voltage sensor, a temperature sensor, an activity sensor, and an acoustic sensor. Preferably, the data processor additionally comprises a communication interface configured for receiving user commands and queries, for requesting user input in respect to said device and for transmitting information relating to the device to the user. Preferably, the communication interface is selected from wired and wireless communication technologies. Preferably, the communication interface is selected from RS232, USB, Firewire™, Ethernet, Zigbee™, Wifi, Bluetooth™, RFJID, wireless USB, cellular, and WMAN communication technologies. Preferably, the processor is configured within a mobile computing device. Preferably, the processor is configured within a mobile computing device selected from the group consisting of a Smartphone, tablet, netbook and laptop computer, an In-Home Display (IHD) platform and a home-energy management device.

Preferably, the sensor is a smart meter. Preferably, the sensor is a smart meter and is only one is present in the premises. Preferably, at step c), device is toggled between on-off or off-on positions at the switching set up more than once. Preferably the user interface provides a graphic representation to the user of the differential. Preferably, the user interface provides a graphic representation to the user of the differential and additionally comprises during switching set up, a prompt to the user to toggle the device between on-off positions up more than once in response to noise in the graphic representation. Preferably, the noise is removed by way of averaging or median calculation of the multiple differential measurements.

A power consumption and notification system comprises:

a) at least one sensor configured to measure at least one desired energy consumption variable associated with at least one energy consumption device within a premises and to generate at least one aggregated output signal therefrom;

b) a data processor configured to receive said aggregated signal from the sensor; said processor comprising a means to create and update a power profile for each at least said one device, said data processor comprising a memory which comprises a catalogue of each of at least said one device and a respective power draw of each such device, said data processor including a means to collect and analyze raw data in real time, from at least one of following sources: Smart grid networks; current sensors; user inputs relating to user-defined budgets; user inputs relating to his behaviors and schedules; user inputs relating to the function and activities of the devices; other user information available through a networked device such as contacts, demographics, etc; GPS and other location signals such as WiFi network IDs, names and signal strengths macrogrid outputs from within a population in which user belongs; television and radio signals; memory based historical consumption data said data processor including means to create communications to user based on information acquired from any of the sources; and c) a user interface.

Preferably real time is within a five minute interval or less. A non-transitory processor readable medium storing code representing instructions to cause a processor to acquire, catalogue and store power consumption data in respect to a first energy consumption device (with an energy draw) within a premises comprising a plurality of energy consumption devices which comprises:

a) providing a sensor configured to measure at least one desired energy consumption variable associated with the plurality of energy consumption devices (including the first device) within the premises and to generate at least one aggregated output signal therefrom;

b) configuring a data processor to receive said aggregated signal from the sensor;

c) creating a power profile for the first device by instructing a user, via a user interface, to independently switch said device between on-off positions ("switching set up"), at least one time, to isolate a power draw for said device from the aggregated signal, wherein data processor recognizes that the first device was selected and isolates a differential in the aggregate signal based on differing switch positions during the switching set up, said differential being the energy draw of the first device; and d) providing a memory which recallably stores the energy draw of the first device in a catalogue. Preferably, the code comprises instructions to create a power profile for a second device by instructing a user, via a user interface, to independently switch said second device between on-off positions ("switching set up"), at least one time, to isolate a power draw for said second device from the aggregated signal, wherein data processor recognizes that the second device was selected and isolates a differential in the aggregate signal based on differing switch positions during the switching set up, said differential being the energy draw of the second device; and to provide a memory which recallably stores the energy draw of the second device in a catalogue.

An unsupervised system for use in creating a profile of, managing and understanding power consumption in a home of a user, wherein said home comprises two or more power consuming devices which system comprises:

at least one sensor configured to measure aggregate energy consumption at the home;

a mobile computing device comprising a data processor;

computer readable memory including computer readable instructions which, when executed by the processor, cause the processor to perform the following steps: i) receive said aggregated signal from the sensor; ii) collect and record the aggregate signal over a plurality of time resolutions and frequencies, iii) create a predicted aggregate signal pattern for each time x and frequency y; vi) to detect changes in the predicted aggregate signal pattern at time x an frequency y (detected consumption pattern changes); and a communication interface operably connected to the mobile computing device and configured for conveying to a user notification of detected consumption pattern changes.

(A)

A system for use in creating a profile of, managing and understanding power consumption in a home, wherein said home comprises two or more power consuming devices which system comprises:

a) at least one sensor configured to measure at least one energy consumption variable associated with at least one energy consumption device within the home ("the selected device") and to generate at least one aggregated output signal therefrom;

b) a mobile computing device comprising a data processor;

c) computer readable memory comprising memory comprising a catalogue of a plurality of devices and one of a respective or estimated power draw of each such device, said memory including computer readable instructions which, when executed by the processor, cause the processor to perform the following steps: i) receive said aggregated signal from the sensor; ii) create and update a power profile for the selected device, iii) collect and analyze raw data in real time, iv) calculate a delta for each selected device (difference between an on state and an off state); v) calculate an estimated delta for the selected device, using ON-OFF-ON sequences (or OFF-ON-OFF) thereby acquiring a start value and end value, and vi) comparing the start value and end value to assess reliability of the estimated delta for the selected device; and d) a communication interface operably connected to the mobile computing device and configured for receiving user commands and queries, for requesting user input in respect to said devices and for transmitting information relating to the devices to the user.

(B)

Preferably, the systems at A above additionally comprise the features of B. Preferably, the communication interface is selected from wired and wireless communication technologies. Preferably, the communication interface is selected from the group consisting of RS232, USB, Firewire™, Ethernet, Zigbee™, Wifi, Bluetooth™ RFJID, wireless USB, cellular, and WMAN communication technologies. Preferably, the data processor creates a power profile for a first selected device by instructing a user, via the interface, to independently switch said device between on-off positions ("switching set up protocol"), at least one time, to isolate a power draw for said device from the aggregated signal, and wherein data processor recognizes that the first device was selected and to isolate a differential in the aggregate signal based on differing switch positions during the switching set up protocol, said differential being the energy draw of the first device.

Preferably, the data processor repeats the switching set up protocol for a plurality of energy consumption devices in the home to create a catalogue of energy draws for such devices but wherein power consumption of all devices in the home are not catalogued via the switching set up protocol. Preferably, the communications interface provides a graphic representation to the user of differentials in power output between toggled switch positions in switching set up protocol. Preferably, the communications interface provides a prompt to the user to toggle the device between on-off positions up more than once in switching set up protocol in response to noise in graphic representation. Preferably, data processor removes noise by way of an averaging-median calculation of multiple differential measurements for the device or by directing toggling of the device between on and off positions. Preferably, data processor estimates reliability of a) information regarding energy draw of a selected device and b) device cost estimation, by directing a user, via the interface, to turn device on and off more than once and using averaging to remove noise. Preferably, data processor reports to the user, via the interface at least one of the following: noise and potential accuracy in device power consumption cost.

Preferably data processor disables "new" device profiling in presence of excessive noise. Preferably, data processor gathers additional data and removes noise using noise removal techniques such as averaging or median in order to compensate for noise. Preferably, processor reports reliability of the estimated delta to a user, via the interface. Preferably, the memory recallably stores energy draws of the devices in a catalogue. Preferably, the processor receives feedback as to state (on-off) of a device. Preferably, the sensor is selected from a current sensor, a voltage sensor, a temperature sensor, an activity sensor, and an acoustic sensor. Preferably, the interface is configured to proactively convey notifications to a user, such notifications being generated by the processor in response to data analysis. Preferably, the processor monitors and analyzes user behaviors, and directs to the user, proactively and via interface, actionable information relating to one or more of: savings potential, home safety recommendations and home security recommendations.

Preferably notifications are generated based on at least one of: i) external events; ii) user-configured internal schedules; iii) feeds from external processors-pushed to the processor; and iv) evaluations performed by the processor based on raw data inputs from at least one of: smart grid networks; current sensors; user inputs relating to user-defined budgets; user inputs relating to his behaviors and schedules; user inputs relating to the function and activities of the devices; other user information available through a networked device such as contacts, demographics, etc; GPS and other location signals such as WiFi network IDs, names and signal strengths; macrogrid outputs from within a population in which user belongs; television and radio signals and memory based historical consumption data.

Preferably, the interface is configured proactively to convey a notification to a user to turn off a device. Preferably, the interface is configured to proactively convey information to a user in regards to at least one of: predicted aggregate signal patterns, power consumption budgeting feedback; evaluated real-time consumption patterns; a user-defined budget, over-budget consumption warnings and under-budget consumption accolades. Preferably, the interface is configured to proactively convey notifications to a user, such notifications being generated by the processor in response to data analysis such notifications: a) proactively reminding users of a "left-on" device; b) providing a breakdown of any devices left on by accident; c) relaying consequences of "left-on" devices; and d) providing home security feedback to users. Preferably, the processor measures at least one energy consumption variable associated with at least one energy consumption device within the home automatically and without a user trigger/request. Preferably, the processor measures at least one energy consumption variable associated with at least one energy consumption device within the home automatically upon receipt of data indicating a noticeable consumption change is observed and b) to ask user to identify source of such consumption change. Preferably, the processor asks a user for additional information, including device classification, and timing and length of the periods of usage of device (e.g., minutes and hours per day, days per months, etc.). Preferably, wherein a user creates a power profile for an energy consumption device by way of an application on a mobile processing device which application may be pre-installed on mobile devices during manufacture or can be downloaded by users/customers from various mobile software distribution platforms, or web applications delivered over, for example, HTTP which use server-side or client-side processing (for example, JavaScript) to provide an "application-like" experience within a Web browser.

Preferably, the data processor monitors a user's 'away from the home' hours based on usual power consumption patterns and stores data in memory in this regard, such monitoring being based upon at least one of the following: specific triggers in real-time power consumption indicative of whether a user is about to leave home; specific triggers in real-time power consumption indicative of whether a user has just left home; user input via interface; cues from a user's computing platform (including GPS signals); and external power signals (including Wi-Fi range and availability) and other metrics usable to gauge a user's proximity to the home.

Preferably, the data processor gathers data incrementally by time (by time of day, weekday vs. weekend, holiday vs. workday) and to identify a user's behaviors based on a) aggregated signal from the sensor; b) power profile for a selected device; c) data acquired directly/indirectly through a application on the mobile computing device platform; d) time of day; e) day of the week and f) time of the year. Preferably, computing device has access to a memory, and the memory stores a record of predicted aggregate signals and detected consumption pattern changes. Preferably, the catalogue so created can be used for consumer analytics: a) defining and classifying user demographics; b) modeling user consumption behavior; c) forecasting utility bills; and d) forecasting consumption (collectively "user classification"). Preferably, the system and method of the invention are used to create targeted advertisements, targeted customer initiatives based on the customer classifications, and to design electric utility programs such as Demand Response based on customer classifications. Preferably, the method and system are deployed via a mobile device application, and by which the user is connectable to other users of the application by a website or remote server and whereby the user and other users exchange data and information.

Preferably, user and other users share user generated content including intelligent conservation targeting strategies (based on user profile, demographic, consumption, and home catalogue information). Preferably, user and other users share comparative data based on a user's community, city, demographics, social circles and social media presence. Preferably, user and other users are connected to exchange information based upon at least one of common or similar community, city, demographics, social circles and social media presence to exchange information on consumption and saving. Preferably, the data processor a) considers input signals and identifies actions of a user in switching on and off more than one device for the purpose of switching set up and cataloguing of all such devices; b) triggers a manual load disaggregation protocol; and c) identifies for the user at least one selected appliance to expedite load disaggregation thereon. Preferably, the system comprises a proactive interface for display of at least one piece of information on a home screen widget, a lock screen, and a status bar. Preferably, the system comprises a processor which enables energy consumption device to mobile computing device communications including a familiarity detector which identifies "habit" information of the user, said habit information being usable to perform device related tasks in the home without user input.

Preferably, the system is enabled for energy consumption device to mobile computing device communications, wherein sensor data relating to docking or undocking of an energy consumption device to a power source is relayed to the processor to create at least one of a docking and undocking profile. Preferably, a processor which collects other user data to aggregate with habit data and docking/undocking profile. Preferably, processor enables energy consumption device to mobile computing device communications including a familiarity detector which collects "habit" data in regards to the user, said processor performing task without user input. Preferably, processor conveys user classification data to a power utility company to identify a subset of users having a selected modeling user consumption behavior. Preferably, classification data provided to utility company enables utility company to create targeted advertisements, targeted customer initiatives based on the customer classifications, and to design electric utility programs such as Demand Response based on customer classifications.

Preferably, the system is used to assist users in shared living arrangements in order to apportion power usage for share billing. Preferably, the system additionally comprises user proffered personal information, entered through the interface of the mobile device. Preferably, the processor is configured to, with at least one of user demographic data, user consumption behavior and forecasts; utility bill forecasts, user historic patterns of power consumption, devise a budget. Preferably, processor is configured, based on at least one of user demographic data, user consumption behavior and forecasts; utility bill forecasts, user historic patterns of power consumption a) to calculate budget balances at any time for a user; b) to calculate forecasted consumption in a selected time; c) to calculate any deviation in forecast vs actual in regards to power consumption. Preferably, processor is configured to detect deviations in habit behavior of user, such deviations indicating an absence from the home. Preferably, processor is configured to engage a user in live, real-time social events relating to power consumption and power conservation.

A method for use in creating a profile of, managing and understanding power consumption in a home of a user, wherein said home comprises two or more power consuming devices which comprises:

measuring, via at least one sensor, aggregate energy consumption at the home;

receiving at a mobile computing device comprising a data processor, said aggregated signal from the sensor;

collecting and recording the aggregate signal over a plurality of time resolutions and frequencies, therein to create a predicted aggregate signal for each time x and frequency;

detecting changes in the predicted aggregate signal at time x an frequency y (detected consumption pattern changes); and conveying to at least one of the user, a utility company, and other third party a notification of detected consumption pattern changes.

Preferably, wherein predicted aggregate signal is a power consumption forecast within the house for time x and frequency y and indicates behavioral patterns of the user (pattern of interest). Preferably, time is measured in an increment selected from the group consisting of second, minutes, hours, days, weeks, months, and years.

Preferably, predicted aggregate signal is a forecast of aggregate power usage over a billing period (forecast bill) and wherein method comprises calculating a forecast bill based on said predicted aggregate signal; comparing an actual bill over the billing period, assessing performance by comparing forecast bill to actual bill as follows:

$$B_R = \sum_{t \in P} C_{t'} \quad B_F = \sum_{t \in P} F_i$$

$$e_P = |B_F - B_R| = \left|\sum_{i \in P} (F_i - C_i)\right|$$

where C is hourly consumption, F is hourly forecast, $B_R$ is real billing cost, $B_F$ is the forecast bill, P is billing period, and $e_P$ is forecast error of the billing period.

Preferably, wherein patterns exist at different time intervals and frequencies and wherein consumption data provided in a resolution, is presented by $C^\alpha$:

$$C^\alpha = \{C_1^\alpha, C_2^\alpha, C_3^\alpha, \ldots, C_N^\alpha\}$$

Preferably to resolve a correct time for a pattern of interest, β:

new size $N = \dfrac{N}{\beta}$ $$C^\beta = \{C_1^\beta, C_1^\beta, \ldots, C_N^\beta\}$$

-continued $$C^\beta = \left\{\sum_{i=1}^{\frac{\beta}{\alpha}} C_i^\alpha, \sum_{i=\frac{\beta}{\alpha}+1}^{2\frac{\beta}{\alpha}} C_i^\alpha, \ldots, \sum_{i=(N-1)\frac{\beta}{\alpha}+1}^{N\cdot\frac{\beta}{\alpha}} C_i^\alpha\right\} \to k = [1, \dot{N}];$$

$$C_k^\beta = \sum_{i=(k-1)\frac{\beta}{\alpha}+1}^{k\frac{\beta}{\alpha}} C_i^\alpha$$

new size N'=N/β, $$C^\beta = \{C\_1^\beta, C\_2^\beta, \ldots, C\_N^\beta\}$$

calculating mean (µ) and deviation (s) of each β-sized time interval (t), within the period length P;

a) P;

$$\text{for } t = \left[1, \frac{p \cdot \alpha}{\beta}\right] \text{ and } d = \left\lfloor\frac{N'}{\frac{p \cdot \alpha}{\beta}}\right\rfloor = \left\lfloor\frac{N}{P \cdot \alpha}\right\rfloor,$$

$$\mu_t = \frac{1}{d}\sum_{i=0}^{d-1} C_{(i \cdot d+t)}^\beta, \quad s_t = \sqrt{\frac{1}{d-1}\sum_{i=0}^{d-1}\left(C_{(i \cdot d+t)}^\beta - \mu_t\right)^2}$$

wherein β≥α since a desired pattern resolution is never smaller than an original data's resolution.

Preferably, forecasting consumption is based on mean and standard deviation and wherein a low standard deviation ($s_t$) indicates a highly repetitive behavior in the given time resolution and offset, a high deviation indicates no significance pattern.

$$B_R = \sum_{i \in P} C_i, \quad B_F = \sum_{i \in P} F_i$$

$$e_P = |B_F - B_R| = \left|\sum_{i \in P}(F_i - C_i)\right|$$

where C is the hourly consumption, F is the hourly forecast, $B_R$ is the real billing cost, $B_F$ is the forecasted bill, P is the billing period, and $e_P$ is the forecast error of the given period.

Preferably, the method additionally comprises an analysis of consumption trends (predicted rate of change in consumption patterns) in the house which comprises:

wherein trends can be examined at different time-resolutions and polynomial orders and wherein a lower time-resolution (large β values) make the trend analysis less sensitive to noise (highly deviated data with insignificant forecasting value) and wherein higher polynomial orders are more responsive to change, but also more sensitive to noise, adjusting the consumption data's resolution;

using linear regression is used to detect the trend:

n: polynomial order, $$c = a_0 \cdot x^n + a_1 \cdot x^{n-1} + \ldots + a_{n-1} \cdot x + a_n$$

wherein x is the time and c is the consumption and wherein the least-squared solution to the above polynomial is:

m: data points, $$\begin{bmatrix} C_1 \\ C_2 \\ \vdots \\ C_m \end{bmatrix} = \begin{bmatrix} 1 & x_1 & x_1^2 & \cdots & x_1^n \\ 1 & x_2 & x_2^2 & \cdots & x_2^n \\ \vdots & \vdots & \vdots & \ddots & \vdots \\ 1 & x_m & x_m^2 & \cdots & x_m^n \end{bmatrix} \begin{bmatrix} a_0 \\ a_1 \\ \cdots \\ a_n \end{bmatrix} \rightarrow Y = XA$$

$$X^T C = X^T XA \Rightarrow A = (X^T X)^{-1} X^T C$$

a) determining consumption at a given time (x)

first order: $tr(x) = a_0 \cdot x + a_1$ n-th order: $tr(x) = a_0 \cdot x^n + a_1 \cdot x^{n-1} + \ldots + a_{n-1} \cdot x + a_n$ b) measuring accuracy of an estimated trend line $$ESS = \sum_{i=1}^{m} (tr(x_i) - c_i)^2 = C^T C - (X^T X)^{-1} X^T C X^T C$$

A method of integrating the patterns before applying a trends analysis comprises:
a) for k patterns and trends,
$^u\mu_x$, $^u s_x$: mean and standard deviation at time x for pattern u
$^v tr(x)$, $^v ESS$: trend estimate and error at time x for trend v $$\begin{cases} u\text{: pattern,} & {}^u p_x = {}^u \mu_x \\ u\text{: trend,} & {}^u p_x = {}^u tr(x) \end{cases}$$

$$w(x) = \sum_{v=1}^{k} \frac{1}{{}^v s_x}, \quad P(x) = \sum_{u=1}^{k} \frac{{}^u p_x \cdot \frac{1}{{}^u s_x}}{w(x)}$$

wherein w(x) represents the total weight of all pattern forecasts at time x, and f(x) represents the final forecast value for all patterns/trends of the same time-resolution and wherein patterns/trends of varying resolution are converted to the lowest time-resolution:

$$p^\alpha = \{p_1^\alpha, p_2^\alpha, \ldots, p_N^\alpha\}, \quad \alpha\text{: resolution,}$$

$\beta$: new resolution, $\beta > \alpha$ $$\left\{\forall i: (t-1) \cdot \frac{\beta}{\alpha} < x_i \le t \cdot \frac{\beta}{\alpha} \bigg| {}^u p_t^\beta = \sum_i {}^u p_i^\alpha \right\}$$

$$P(x) = {}^{hi} p_x^\beta \cdot \frac{{}^{lo} p_x^\alpha}{{}^{lo} p_{t: (x \in t)}^\beta}$$

$$\tilde{S}_x^\alpha = {}^{to} s_x^\alpha \cdot \frac{{}^{lo} p_x^\alpha}{{}^{lo} p_{t: (x \in t)}^\beta}$$

A method comprises the following steps:
a) integrate all patterns of the highest resolution;
b) integrate no patterns/trends at lower resolution;
c) integrate all patterns at next highest resolution;
d) convert patterns/trends of varying resolution to the lowest time-resolution; and
e) repeat steps a) to d) until no low resolution patterns exists.

Preferably, the utility receives information relating to detected consumption pattern changes and then directs notification to the user of at least one of messages selected from the group consisting in whole or part of:
a grid within which home is located is experiencing an unusual over-consumption
a request to user to turn off at least one power consuming device.

Preferably, the utility company offers an incentive to user to turn off at least one power consuming device. Preferably, said incentive is selected from the group consisting of cash and prizes. Preferably, the processor is configured within a mobile computing device selected from the group consisting of a Smartphone, tablet, netbook and laptop, an In-Home Display (IHD) platform and a home-energy management device.

Preferably, a mobile application runs on mobile computing device and enables operation of the method and wherein utility company and user interact via mobile application. Preferably, a mobile application runs on mobile computing device and enables operation of the method. Preferably, the notification of detected consumption pattern changes is conveyed via a communication interface selected from the group consisting of RS232, USB, Firewire™, Ethernet, Zigbee™, Wifi, Bluetooth™, RFJID, wireless USB, cellular, and WMAN communication technologies.

The invention claimed is:

1. A system for monitoring and analyzing electricity consumption in a home of a user, the home comprising multiple electricity consuming appliances, the system comprising:
one or more electricity sensors configured to measure individual electricity consumption of each of the appliances and a total electricity consumption of the home, wherein the one or more sensors are not located on any of the appliances;
a mobile computing device of the user;
a processor in the mobile computing device configured to:
receive signals from the one or more sensors, wherein the signals indicate the electricity consumption of the appliances and the home;
identify a first overconsumption of individual electricity by one of the appliances greater than a first budgeted tolerance for the one appliance during a first time period based on the received signals; and
determine that the first overconsumption is forecasted to cause a second overconsumption of the total electricity by the home greater than a second budgeted tolerance for the home during a second time period, wherein the second time period includes the first time period; and
a user interface on the mobile computing device configured to display a notification in response to receiving the determination from the processor, wherein the user reduces the individual electricity consumption of the one appliance in response to the notification being displayed.

2. The system of claim 1, wherein the second overconsumption is a change from a usual consumption pattern.

3. The system of claim 2, wherein the usual consumption pattern is trending.

4. The system of claim 3, wherein the processor is further configured to:

calculate the usual consumption pattern using signals from the one or more sensors that are not older than a predetermined amount of time.

5. The system of claim 1, wherein the processor is further configured to:
identify a consumption pattern change of the home;
determine that the consumption pattern change represents an intrusion of the home; and
send a notification of said consumption pattern change to a security system.

6. The system of claim 5, wherein the processor is further configured to:
determine that the consumption pattern change represents a hazard, wherein the notification is informative of the hazard.

7. The system of claim 6, wherein the processor is further configured to:
determine that the consumption pattern change corresponds to one of the appliances being left switched on.

8. The system of claim 1, wherein the processor is further configured to:
identify a consumption pattern change of the home; and
send a notification of the consumption pattern change to the user interface.

9. The system of claim 8, wherein the consumption pattern has a duration of a day or a week.

10. The system of claim 9, wherein:
when the consumption pattern has a duration of a day, the consumption pattern has a resolution of an hour; and
when the consumption pattern has a duration of a week, the consumption pattern has a resolution of a day.

11. The system of claim 1, wherein the processor is further configured to:
present on the user interface appliances that are offered by third party retailers and a savings value of each appliance offered.

12. The system of claim 11, wherein the notification indicates either that one appliance of said multiple appliances may be broken or that said one appliance may be old.

13. The system of claim 1, wherein the processor is further configured to:
determine a behavioral pattern of the user based on the electricity consumption of the appliances; and
trigger one of the appliances based on the behavioral pattern.

14. The system of claim 1, wherein an appliance is an air conditioner, a clothes washer, a clothes dryer, a hot tub, an oven, a heater, a coffee maker, a tool, an electrical socket, or lighting.

15. A method for monitoring and analyzing electricity consumption in a home of a user, the home comprising multiple electricity consuming appliances, the method comprising:
configuring one or more electricity sensors to measure individual electricity consumption of each of the appliances and a total electricity consumption of the home, wherein the one or more sensors are not located on any of the appliances;
receiving, by a processor in a mobile computing device of the user, signals from the one or more sensors, wherein the signals indicate the electricity consumption of the appliances and the home;
identifying, by the processor, a first overconsumption of individual electricity by one of the appliances greater than a first budgeted tolerance for the one appliance during a first time period based on the received signals;
determining, by the processor, that the first overconsumption is forecasted to cause a second overconsumption of the total electricity by the home greater than a second budgeted tolerance for the home during a second time period, wherein the second time period includes the first time period; and
displaying, by a user interface of the mobile computing device, a notification in response to receiving the determination from the processor, wherein the user reduces the individual electricity consumption of the one appliance responsive to the notification being displayed.

16. The method of claim 15, further comprising the processor:
identifying a consumption pattern change of the home;
determining that the consumption pattern change represents an intrusion of the home; and
sending a notification of said consumption pattern change to a security system.

17. The method of claim 15, further comprising the processor determining that the consumption change represents a hazard, wherein the notification is informative of the hazard.

18. The method of claim 15, further comprising the processor:
presenting, on the user interface, a list of appliances that are offered by third party retailers; and
presenting, on the user interface, a savings value of each appliance offered.

19. The method of claim 15, further comprising the processor:
determining a behavioral pattern of the user based on the electricity consumption of the appliances; and
triggering one of the appliances based on the behavioral pattern.

20. The method of claim 15, wherein an appliance is an air conditioner, a clothes washer, a clothes dryer, a hot tub, an oven, a heater, a coffee maker, a tool, an electrical socket, or lighting.

* * * * *